United States Patent [19]
Maebara et al.

[11] Patent Number: 5,258,980
[45] Date of Patent: Nov. 2, 1993

[54] RADIO CHANNEL SWITCHING CONTROL METHOD

[75] Inventors: Akihiro Maebara; Seizo Onoe, both of Yokohama; Fumiyuki Adachi, Yokohama; Masaharu Hata; Toshinori Fujii, both of Yokosuka, all of Japan

[73] Assignee: Nippon Telegraph and Telephone Corporation, Tokyo, Japan

[21] Appl. No.: 684,924

[22] PCT Filed: Aug. 24, 1990

[86] PCT No.: PCT/JP90/01076
§ 371 Date: Apr. 24, 1991
§ 102(e) Date: Apr. 24, 1991

[87] PCT Pub. No.: WO91/03110
PCT Pub. Date: Mar. 7, 1991

[30] Foreign Application Priority Data

Aug. 25, 1989 [JP] Japan .................. 1-217230
Sep. 4, 1989 [JP] Japan .................. 1-227598

[51] Int. Cl.$^5$ .............................................. H04J 3/16
[52] U.S. Cl. ................................ 370/95.1; 370/100.1; 375/114
[58] Field of Search ............... 370/95.1, 100.1, 104.1, 370/105; 379/58, 59, 60; 455/33.1, 33.2, 53.1, 54.1, 11.1, 18, 10, 9; 375/106, 107, 108, 114

[56] References Cited

U.S. PATENT DOCUMENTS

| | | | |
|---|---|---|---|
| 4,450,558 | 5/1984 | Hampton et al. | 375/114 |
| 4,480,328 | 10/1984 | Alaria et al. | 370/95.3 |
| 4,654,867 | 3/1987 | Labedz et al. | 379/59 |
| 4,823,362 | 4/1989 | Etoh | 379/59 |
| 4,912,756 | 3/1990 | Hop | 379/60 |
| 5,040,195 | 8/1991 | Kosaka et al. | 375/105.4 |
| 5,081,704 | 1/1992 | Umeda et al. | 370/95.3 |

FOREIGN PATENT DOCUMENTS

| | | |
|---|---|---|
| 0318033 | 5/1989 | European Pat. Off. |
| 64-12628 | 1/1989 | Japan |
| 64-41529 | 2/1989 | Japan |

Primary Examiner—Douglas W. Olms
Assistant Examiner—Shick Hom
Attorney, Agent, or Firm—Pollock, VandeSande and Priddy

[57] ABSTRACT

A radio channel switching control method for a digital mobile communication system employing TDMA techniques, in which a mobile station stores the synchronized state in the current channel, switches the current channel to a new one and performs a pull-in operation for a predetermined period of time and stores the synchronized state obtained by the pull-in operation. The mobile station establishes synchronism with the new channel by repeating a sequence of steps of performing communication again in the synchronized state in the current channel and performing the pull-in operation in the stored synchronized state for the new channel. Thus, it is possible to implement radio channel switching free from momentary interruption of communication, by maintaining communication in the current channel until synchronization with the new channel is established and communication is permitted. A common reference clock is applied to a plurality of pieces of radio equipment in a base station and each radio equipment obtains a synchronized state parameter for an arbitrary slot of the channel allocated thereto. When it is judged that channel switching is necessary, the synchronized state parameter in the current channel is set in the radio equipment of the new channel, by which the radio equipment of the new channel is caused to immediately start reception in the same synchronized state as in the current channel.

12 Claims, 18 Drawing Sheets

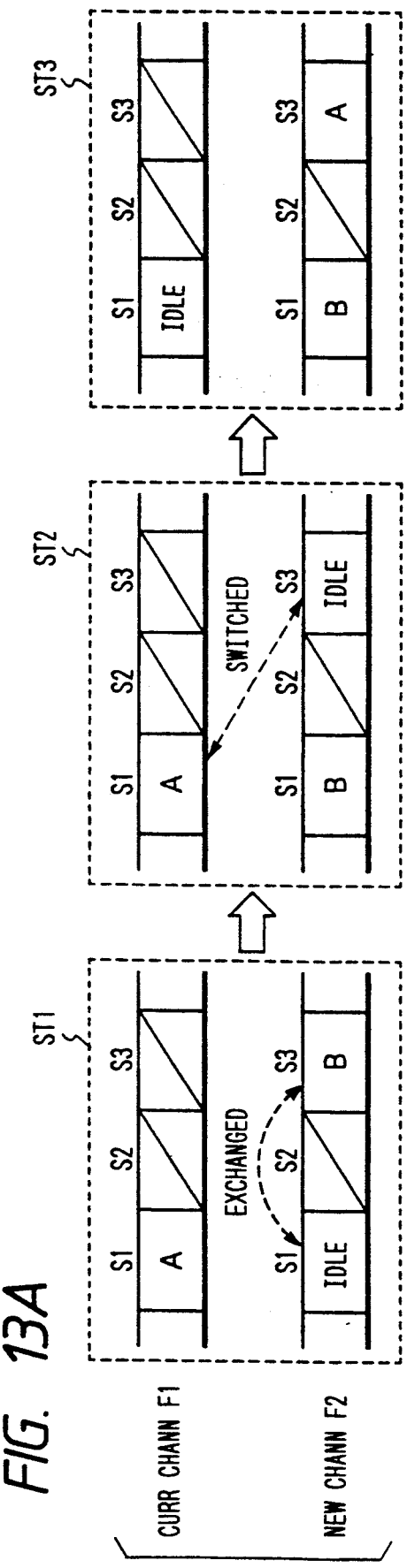

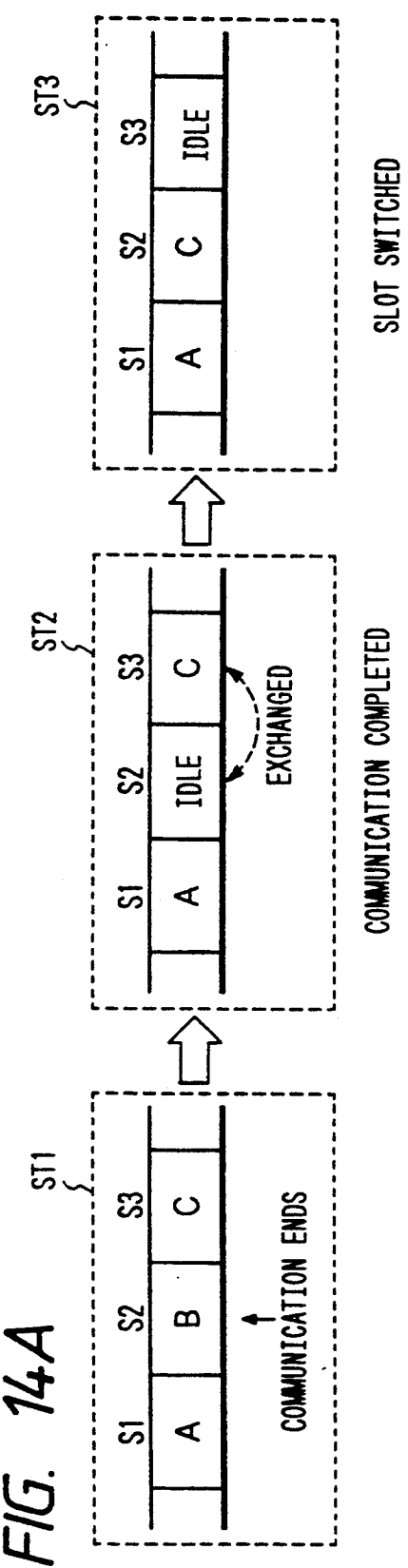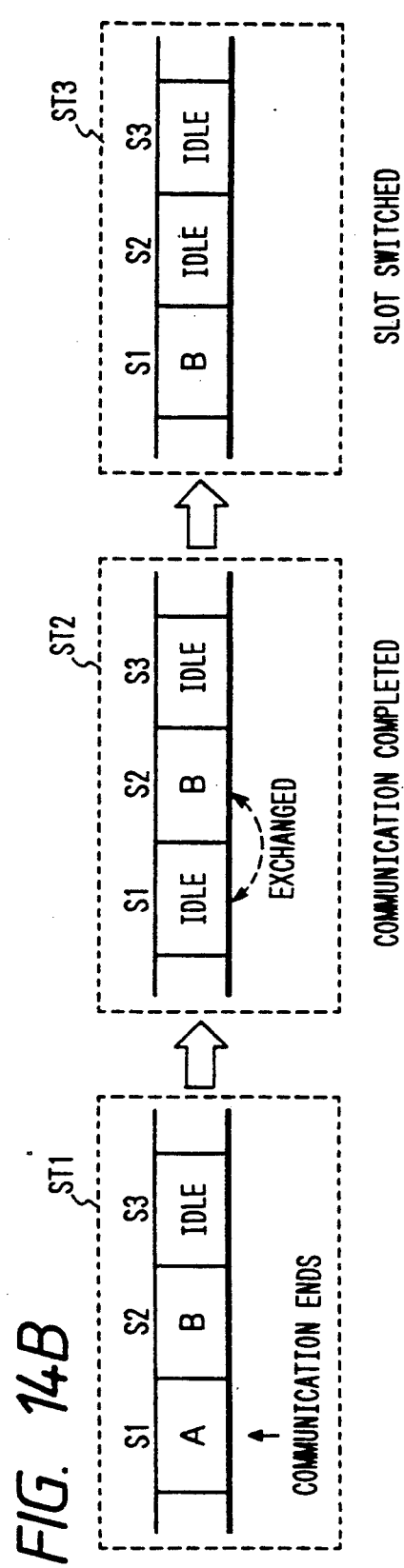

RADIO CHANNEL SWITCHING CONTROL METHOD

TECHNICAL FIELD

The present invention relates to a radio channel switching control method in a digital mobile communication system employing TDMA techniques.

BACKGROUND ART

In a mobile communication system like land mobile radiotelephone a zone which permits a mobile station to communicate with one base station is limited by the radio wave transmitting power used; therefore, in the case of implementing a wide service area, a number of zones Z1, Z2, ... including base stations B1, B2, ..., respectively, are provided, for example, as shown in FIG. 1, in such a manner as to permit communication from any zone via its base station and an exchange 20. Adjacent zones use signals of different frequencies to prevent interference between signals of different zones. In such a mobile communication system, when a certain mobile station 10 moves from the zone Z1 to the adjoining one Z2 while maintaining communication, the radio channel frequency used must be switched from F1 to F2 and during this hand off the communication is temporarily interrupted; this is a well-known problem in the art.

In recent years there has been under study the introduction of a digital mobile communication system employing TDMA (Time Division Multiple Access) techniques. In the digital mobile communication system utilizing the TDMA techniques each mobile station holds communication in each zone, using a designated time slot of a frequency specified by the base station in that zone. A communication channel specified in terms of frequency and time slot will hereinafter be referred to as a radio channel, but in the case where it is not intended to specify any particular time slot in the following description, the channel will be also called a frequency channel. Also in this instance, when the mobile station moves from a certain zone to an adjacent one, the radio channel must be switched accordingly. It is easily predictable that the switching of the radio channel will cause a momentary interruption of communication also in such a well-known digital mobile communication system which utilizes the TDMA techniques.

FIG. 2 is a timing chart for explaining the radio channel hand off procedure in the digital mobile communication system employing the TDMA techniques and the momentary interruption of communication which results from the channel hand off. Now, let it be assumed that the mobile station 10 moves from the zone Z1 to the zone Z2 in FIG. 1. Row A in FIG. 2 shows a signal of a frequency F1 transmitted from the base station B1. The transmitted signal is a recurrence of a TDMA frame FR which is composed of a predetermined number of, for instance, three time slots S1, S2 and S3, and for communication with the mobile station 10 in the zone, one time slot, the first time slot S1 in this example, is used. Row B in FIG. 2 shows a signal of a frequency F2 being transmitted from the base station B2 of the zone Z2 into which the mobile station 10 is to enter. Assume that the mobile station 10 uses an idle third time slot S3 of the transmitted signal from the base station B2 in the zone Z2. Row C shows a signal received by the mobile station 10 and row D the frequency of the received signal. Row E shows a signal transmitted from the mobile station 10 and row F a signal received by the base station B2 in the zone Z2.

When the reception at the frequency F1 gets worse as the mobile station 10 approaches the zone Z2, the base station B1 specifies the radio channel to be used, i.e. the frequency F2 and the time slot S3, through a signal A1 of the first slot S1 of the frame FR1 shown in row A of FIG. 2. Upon reception of such a radio channel specify signal, the mobile station 10 switches the receiving frequency to F2 as depicted in row D of FIG. 2, receives a signal of the frequency F2 from the base station B2, shown in row B of FIG. 2, and then establishes synchronization with a signal B1 of the third slot S3 of the frame FR1. This ensures correct reception of signals of the third slot S3 in the frame FR2 and subsequent frames FR3, FR4, ... of the signal of the frequency F2. On the other hand, when the mobile station 10 transmits a signal U2 to the base station B2 in the third slot S3 of the next frame FR2 after establishment of synchronization for reception, the base station B2 establishes synchronization for reception with respect to the signal U2. Consequently, the base station B2 correctly receives signals U3, U4, ... of the third slot S3 from the mobile station 10 in the next and subsequent frames FR3, FR4, FR5, ....

Incidentally, the base station B2 uses, for the establishment of synchronization, the signal U2 received from the mobile station 10 in the slot S3 of the frame FR2 but cannot receive it as a communication signal—this means the occurrence of a momentary cutoff of communication. Moreover, in the case where the base station B2 fails to establish synchronization with the signal U2 from the mobile station 10, it uses, for establishment of synchronization for reception, the signal U3 from the mobile station 10 in the slot S3 of the frame FR3, and hence cannot receive the signal U3 as a communication signal in the slot S3. In the above the mobile station 10 has been described to have established synchronization for reception, in the slot S3 of the frame FR1, with respect to the signal B1 from the base station B1 in the frame FR1, but if the mobile station fails to establish the synchronization, the mobile station 10 uses a signal B2 from the base station B2 in the next frame FR2 to establish synchronization for reception, and hence cannot receive the signal B2 as a communication signal.

As mentioned above, the conventional digital mobile communication system, which merely applies the TDMA techniques to the mobile communication system, also suffers from the problem of an instantaneous interruption of communication by the switching of the radio channel.

The above description has been given of the momentary interruption of communication which is caused by the switching of the radio channel when the mobile station moves from a certain zone to the adjoining one, but also in the case where communication of the mobile station with the base station in the same zone is degraded by interference of other signals such as an interference signal of the same frequency as that of the received signal or its multiple reflection, the communication is interrupted momentarily when the channel is switched to another frequency channel assigned to the same base station.

It is therefore an object of the present invention to provide a radio channel hand off method which solves the above-mentioned problem encountered in the digital mobile communication system employing the TDMA techniques, and hence precludes the possibility of such a momentary interruption of communication as described above.

DISCLOSURE OF THE INVENTION

According to a first aspect of the present invention, the mobile station has means for storing a plurality of pieces of synchronized state information and stores in the storage means the latest synchronized state information for the slot of the radio channel currently used for TDMA communication. When a new channel is specified, the radio channel is switched thereto, which is followed by the acquisition of synchronization for reception for a certain period of time. Where the synchronization cannot be established, the progress of the pull-in process is stored as synchronized state information for the new channel, and at the same time, the prestored state of synchronization with the old channel is reproduced and a signal is received in the old channel, after which the channel is switched again to the new channel and the acquisition of synchronization for reception is made. This operation is repeated until the synchronization is established.

According to a second aspect of the present invention, pieces of radio equipment which are in TDMA communication with mobile stations in the base station over individual channels, each store information of the state of synchronization with a signal from the corresponding mobile station. When it is judged that the base station, while communicating with a desired mobile station, should be switched to another radio channel in the same zone, the synchronized state information of radio equipment currently in use, for the mobile station, is set in new radio equipment to thereby permit it to immediately receive a signal from the mobile station in the new channel in synchronism therewith.

BRIEF DESCRIPTION OF THE DRAWINGS

FIG. 13A is a diagram showing a slot switching procedure;

FIG. 13B is a diagram showing another slot switching procedure;

FIG. 14A is a diagram showing slot switching;

FIG. 14B is a diagram showing slot switching;

BEST MODE FOR CARRYING OUT THE INVENTION

Figure 1:
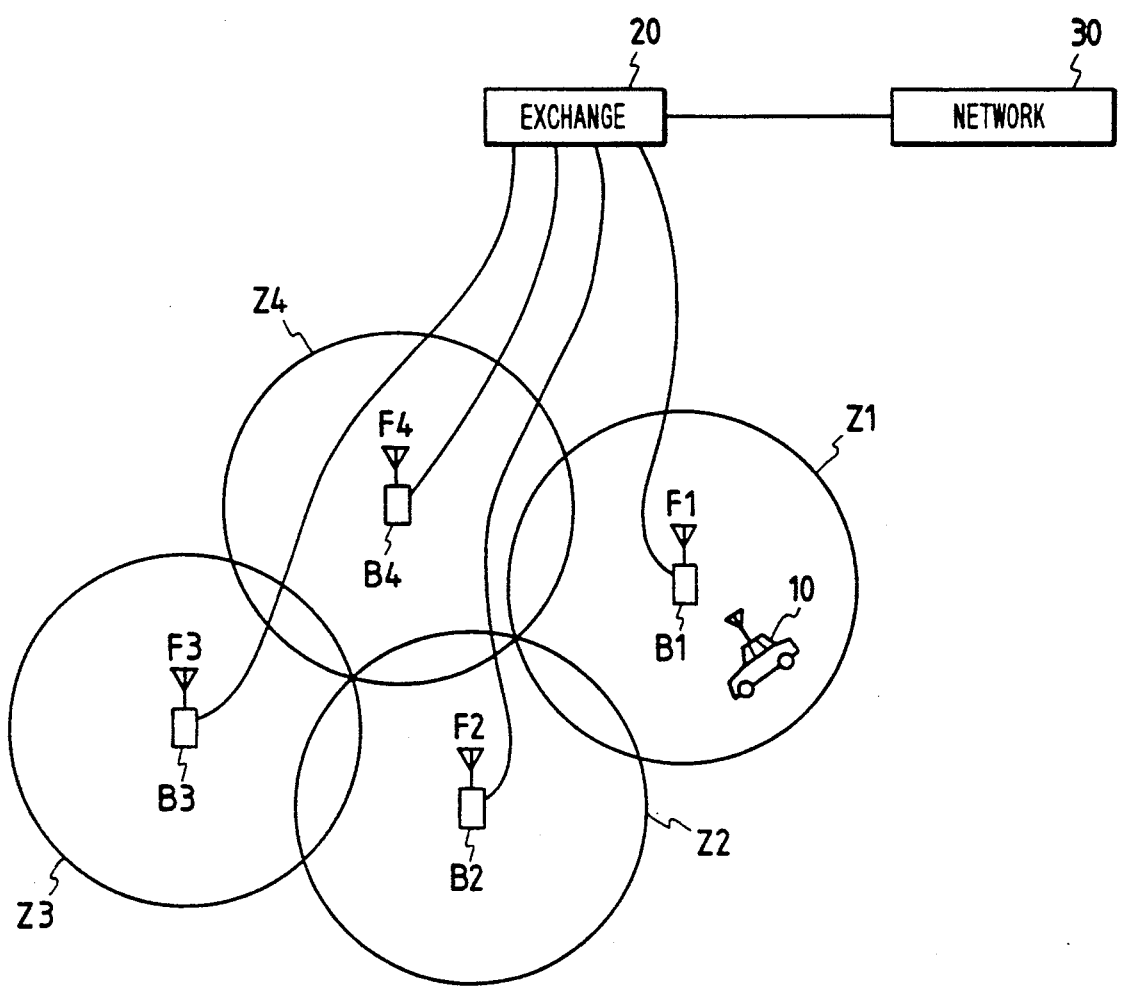
FIG. 1 is a diagram for explaining the outline of a conventional mobile communication system.
Figure 2:
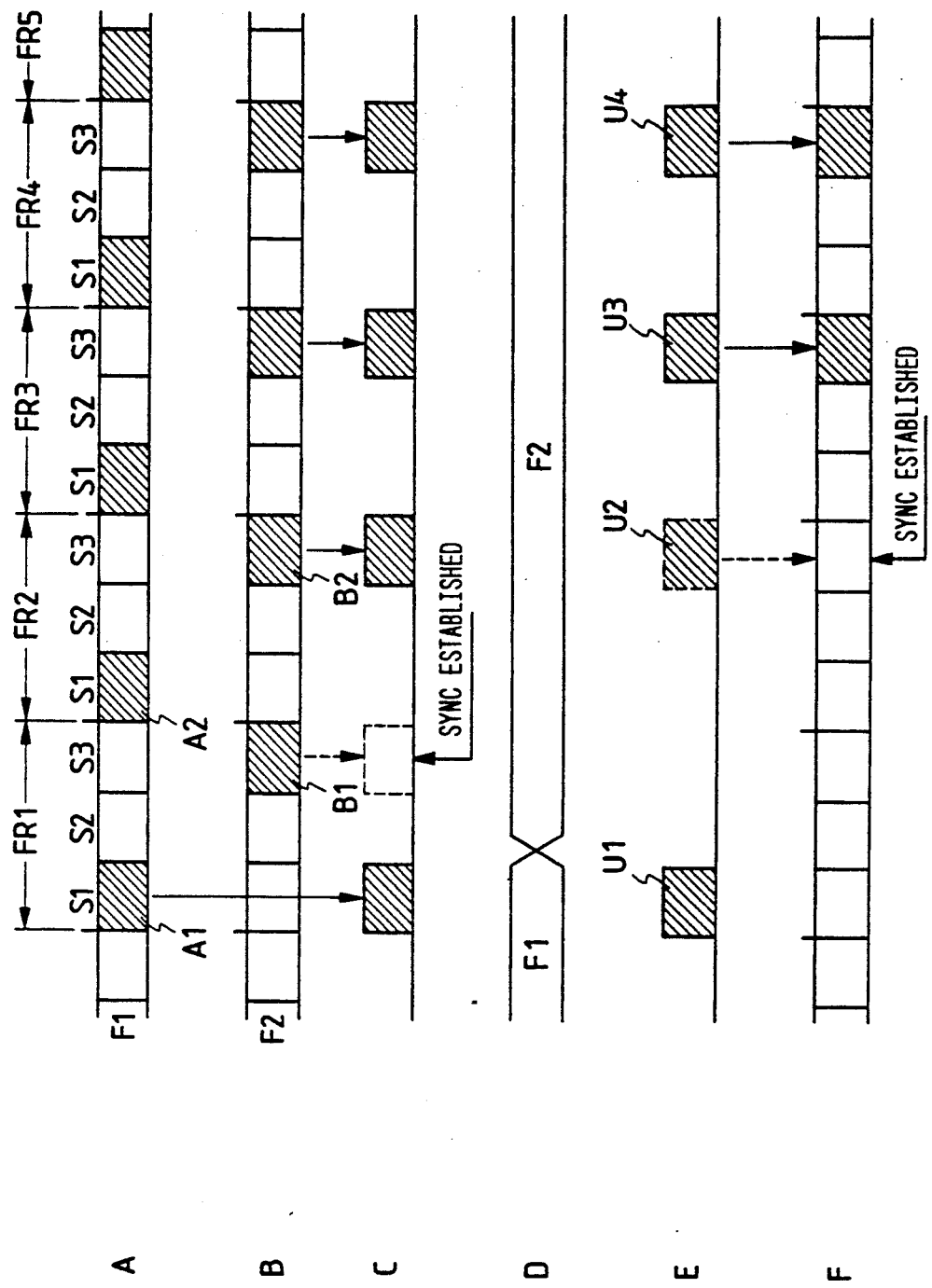
FIG. 2 is a timing chart showing a communication in the case of applying the TDMA techniques to the system depicted in FIG. 1.
Figure 3:
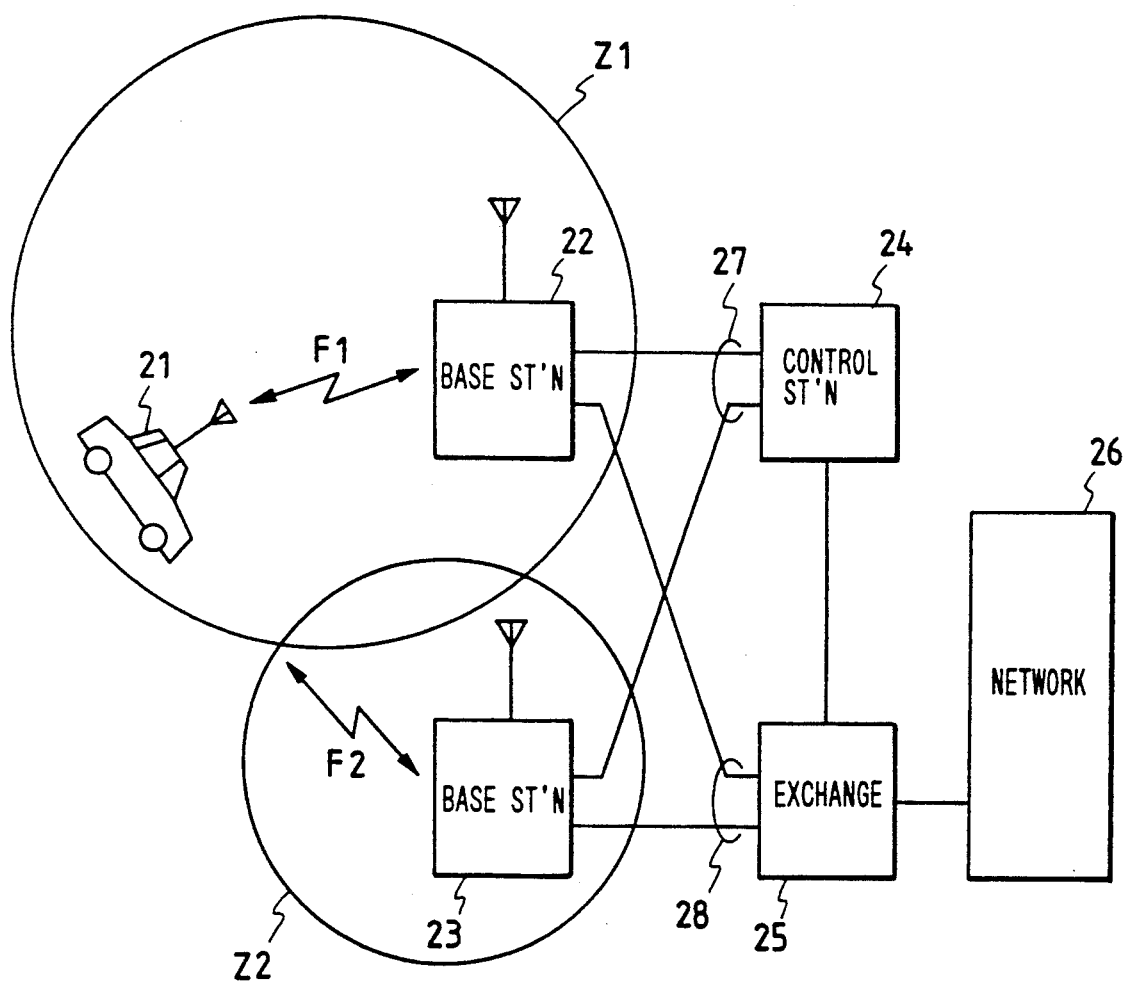
FIG. 3 is a diagram showing a mobile communication system which embodies the radio channel switching method of the present invention.

FIG. 3 illustrates in block form an example of the configuration of a mobile communication system which embodies the radio channel switching method of the present invention. This example is basically identical in system configuration with the prior art example depicted in FIG. 1.

In FIG. 3, reference numeral 21 denotes a mobile station moving in the zone Z1 in a service area, 22 a base station in the zone Z1, 23 a base station in the zone Z2 adjoining the zone Z1, 24 a control station for controlling the base stations 22 and 23 and the mobile station 21, 25 an exchange which effects the connection and switching of circuits, 26 a network, 27 control lines, and 28 communication lines.

The mobile station 21 in the zone Z1 communicates with the base station 22, using a signal of the frequency F1, and is connected to the network via the communication line 28 and the exchange 25. When the receiving condition in the mobile station 21 or the base stations 22 and 23 over the current radio channel is deteriorated more than a predetermined amount, the control station 24 specifies a new radio channel via the control line 27. For example, when the level of the signal from the mobile station 21 received by the base station 22 goes below a predetermined value as the mobile station 21 approaches the zone Z2, the control station 24 instructs the mobile station 21 via the base station 22 to switch the current radio channel to that of the frequency F2. Upon receiving the switching instruction, the mobile station 21 switches its receiving frequency to F2, establishes synchronization for reception, based on a signal transmitted from the base station 23, and then transmits a signal of the frequency F2 to the base station 23 in synchronism with the received signal. While in practice the frequencies for transmission from the base station 22 to the mobile station 21 and from the latter to the former differ and are spaced apart, they are indicated generally by the same reference character F1 for the sake of brevity. The same is true of the frequency F2 which is used for communication between the mobile station 21 and the base station 23.

Figure 4:
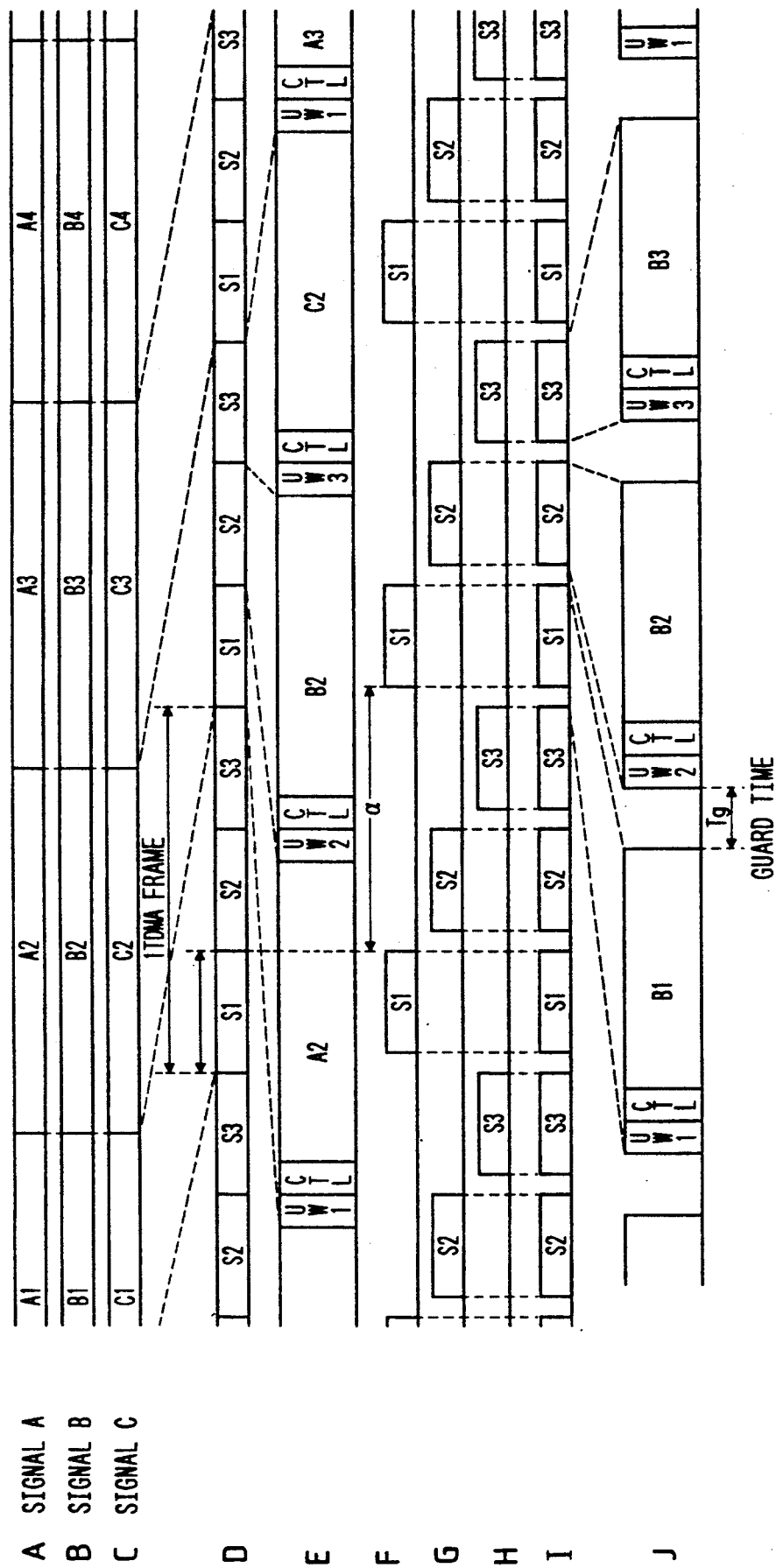
FIG. 4 is a diagram showing configurations of a variety of signals which are transmitted and received in this invention method employing the TDMA techniques.

FIG. 4 is a diagrammatic representation of the signal configuration of a three-channel TDMA system according to an embodiment of the present invention.

Three different communication signals A, B and C, shown in Rows A, B and C, are divided for each frame of a fixed length, and corresponding communication signals thus divided, for example, A2, B2 and C2, are time compressed and, as shown on an enlarged scale in Row E, they are headed with unique words UW1, UW2 and UW3 indicating their slot positions and then inserted into three time slots S1, S2 and S3 in one TDMA frame corresponding to the above-mentioned frame of a fixed length, thus forming a multiplexed base station transmission signal shown in row D.

The mobile station 21 receives this base station transmission signal and transmits a signal synchronized therewith. Rows F, G and H in FIG. 4 show the case where three mobile stations transmit in the slots S1, S2 and S3, respectively, and an example in which the mobile stations transmit compressed communication signals about two slots after receiving the corresponding slots S1, S2 and S3 of the base station transmission signal depicted on Row D. The transmission signals from these mobile stations are arranged on the time axis as shown on Row I and received by the base station one after another accordingly. The three mobile stations transmit the communication signals appended with the unique words UW1, UW2 and UW3 indicating the slots assigned to them, respectively, as depicted on an enlarged scale in Row J. The length of the communication signal including the unique word in each slot is selected so that a guard time Tg may be provided between the slots of the signals received by the base station.

Figure 5:
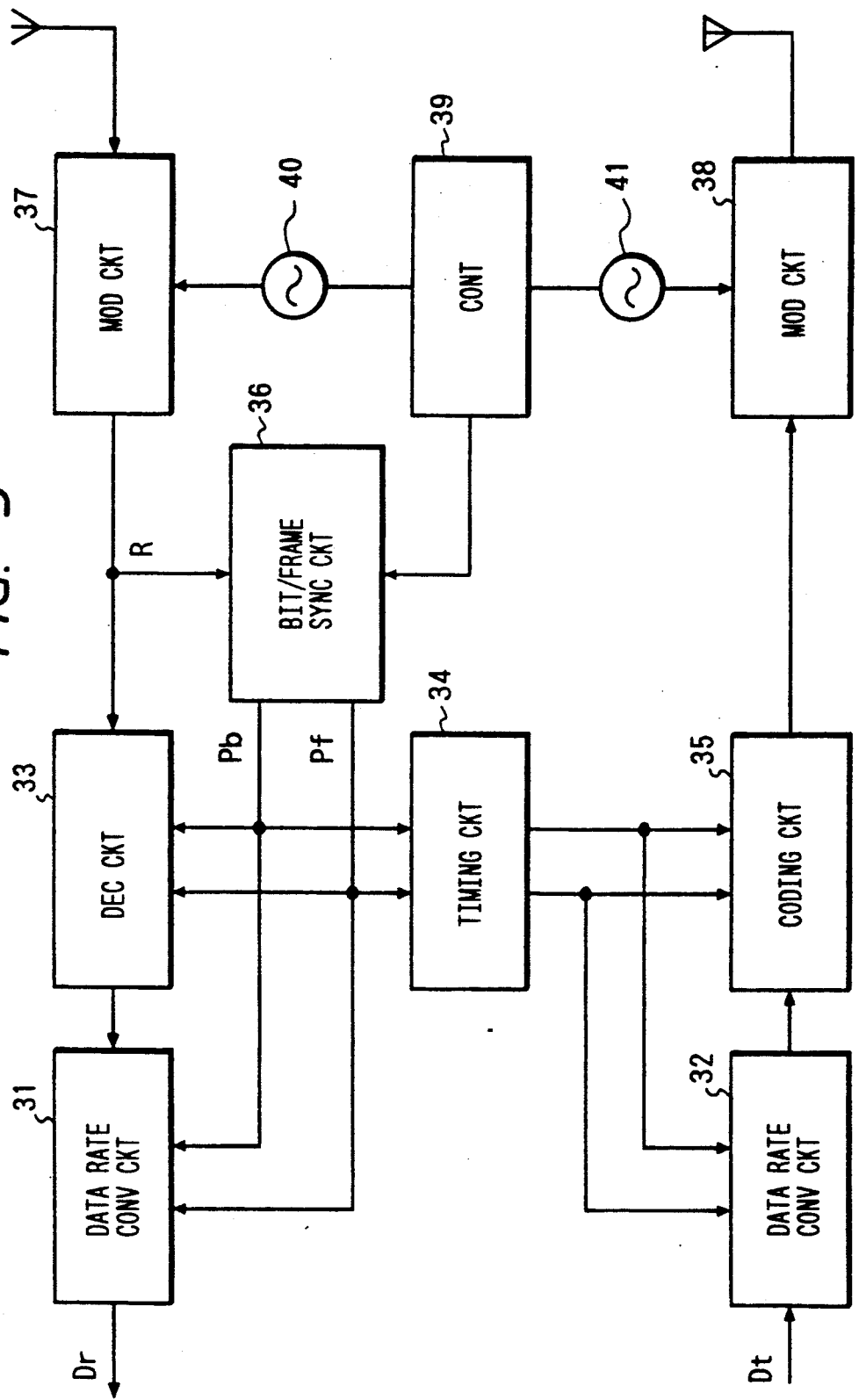
FIG. 5 is a functional block diagram of a mobile station in the system embodying the method of the present invention.

FIG. 5 illustrates in block form a transmitting-receiving circuit of the mobile station 21 employing the method of the present invention.

In FIG. 5, reference numerals 31 and 32 denote data rate conversion circuits, 33 a decoding circuit, 34 a timing circuit, 35 a coding circuit, 36 a bit/frame synchronizing circuit, 37 a demodulating circuit, 38 a modulating circuit, 39 a controller, and 40 and 41 local oscillators. Since it is necessary here for the mobile station to synchronize with the two base stations 22 and 23, the bit/frame synchronizing circuit 36 is provided with two independent phase synchronizing circuits and is switched between them in response to an instruction from the controller 39 as described later on. In this instance, one synchronizing system can be used by many base stations on a time-shared basis, by providing means for storing the state of synchronization represented by a bit phase difference and a frame timing phase difference between a reference clock in the bit/frame synchronizing circuit 36 and the received signal.

In the demodulating circuit 37, for example, the signal of the frequency F1 received from the base station 22 is synchronously detected by a local signal from the local oscillator 40, by which a detected signal R is obtained. The detected signal R is applied to the bit/frame synchronizing circuit, wherein a bit synchronizing signal Pb and a frame synchronizing signal Pf are detected. The timing circuit 34 delays, for a fixed period of time $\alpha$, the bit synchronizing signal Pb and the frame synchronizing signal Pf provided from the bit/frame synchronizing circuit 36, in order for the mobile station to transmit a signal the fixed period of time $\alpha$ after receiving a signal from the base station, as referred to previously in respect of FIG. 4. The transmitting side data rate converting circuit 32 time-compresses an input digital communication signal Dt with the delayed bit synchronizing signal Pb and the delayed frame synchronizing signal Pf for each frame and inserts the time-compressed signal into an allotted time slot in the frame. The coding circuit 35 codes the time-compressed digital communication signal into, for instance, an error correcting code. The output of the coding circuit 35 is applied to the modulating circuit 38 for modulating a carrier signal from the oscillator 41. The carrier signal thus modulated is transmitted to the base station. Each detected signal R of the detected slot length, from the demodulating circuit 37, is subjected to processing for decoding the error correcting code in the decoding circuit 33 and is then provided to the data rate converting circuit 31, which time expands it to the length of one TDMA frame, outputting it as a digital communication signal Dr.

Figure 6:
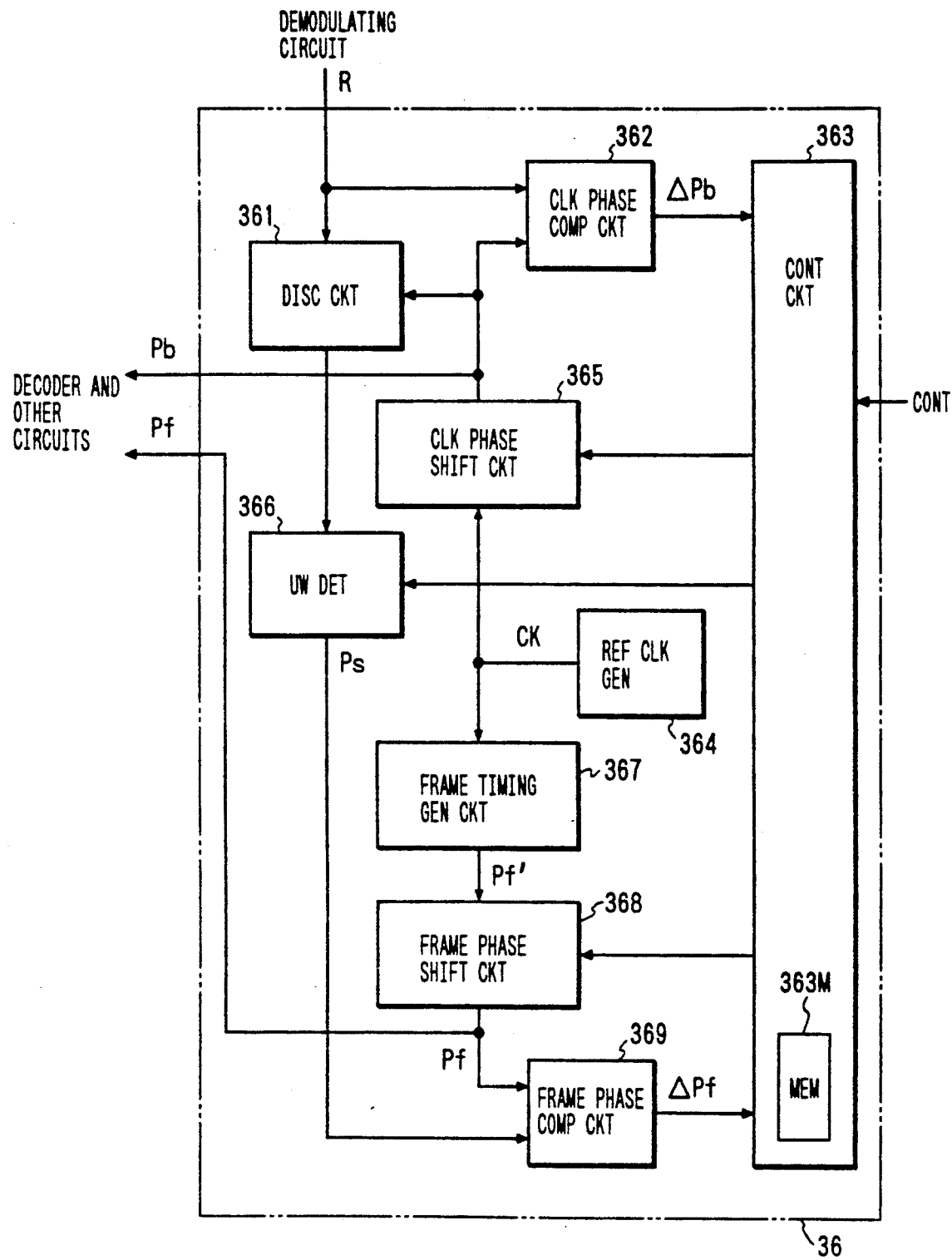
FIG. 6 is a block diagram of a bit/frame synchronization circuit in FIG. 5.

FIG. 6 is a block diagram of the bit/frame synchronizing circuit 36 used in FIG. 5 for practicing the method of the present invention. The detected signal R from the demodulating circuit 37 is applied to a clock phase comparator 362, wherein it is phase compared, for each bit, with a reference clock CK provided via a clock phase shifter 365 from a reference clock generator 364 and from which a phase difference $\Delta Pb$ is output. A control circuit 363 controls the amount of phase shift of the clock phase shifter 365 in accordance with the phase difference $\Delta Pb$, by which the reference clock CK to be provided to the clock phase comparator 362 is synchronized with the bits of the input detected signal R. The output phase difference $\Delta Pb$ from the clock phase comparator 362 is stored in a memory 363M in the control circuit 363 and is updated at regular time intervals.

Further, the detected signal R is subjected to the discrimination of its level in a discrimination circuit 361 at the timing of the phase-shifted reference clock CK, and the discriminated output is applied to a unique word detector 366. The unique word detector 366 is being supplied, from the control circuit, with a unique word UW corresponding to the slot currently used by the mobile station and outputs a pulse Ps upon each detection of a bit string which matches the unique word UW in a bit stream output from the discrimination circuit 361. Therefore, the output pulse Ps represents the position of the allotted slot in each frame. The clock from the reference clock generator 364 is also supplied to a frame timing generator 367, which, upon each counting of a predetermined number of clocks, outputs a pulse and hence yields a frame pulse Pf' of a period corresponding to the frame length. The frame pulse Pf' is phase shifted in a frame phase shifter 368 by the amount specified by the control circuit 363 and is then output as the frame synchronizing signal Pf. The output Ps of the unique word detector 366 and the output Pf of the frame phase shifter 368 are compared by a frame phase comparator 369 to detect the phase difference $\Delta Pf$ therebetween. Based on the frame phase difference $\Delta Pf$ thus obtained, the control circuit 363 controls the amount of phase shift by the frame phase shifter 368, thereby obtaining the frame synchronizing signal synchronized with the beginning of the designated slot. The control circuit 363 fetches the output phase difference $\Delta Pf$ of the frame phase comparator 369 at regular time intervals and stores it in the memory 363M and updates it. Incidentally, in the case where the mobile station has switched the radio channel, the phase difference data $\Delta Pb$ and $\Delta Pf$ are stored in new storage areas in the memory 363M, and the pieces of phase difference data stored in connection with the radio channel used so far are retained.

Since the bit/frame synchronizing circuit 36 is configured as described above, it stores, as the bit phase difference ΔPb and the frame phase difference ΔPf from the reference clock, the state of synchronization with the radio channel of the frequency F1, for example, which is currently used by the mobile station 21. Therefore, even after the mobile station has switched to the radio channel of the frequency F2 and established synchronization therewith, it can immediately establish again synchronization with the previous radio channel of the frequency F1 by switching thereto and reading out the bit phase difference ΔPb and the frame phase difference ΔPf stored in the memory 363M and setting them in the clock phase shifter 365 and the frame phase shifter 368, respectively.

Now, a description will be given of the radio channel switching operation for the mobile station 21 to move from the zone Z1 of the base station 22 to the zone Z2 of the base station 23 in the system configuration of FIG. 3 when the present invention is employed therefor.

A multiple transmission and a multiple reception that are used in the present invention will be described first.

As is practiced in conventional mobile communication, the mobile station 21 transmits receiving level information on a control signal from the base station in each zone at the present time to the base station in the current zone, using a control bit CTL inserted in each slot of a control channel associated with the channel for communicating with the base station as shown on Row J in FIG. 4. The pieces of receiving level information thus transmitted to the base station are sent to the control station 24. The control station 24 monitors the receiving conditions in respective mobile stations to thereby detect their current positions and also places idle radio channels under control.

Where reception on the radio channel of, for example, the frequency F1, by the mobile station, has become worse than a predetermined degree of quality and the control station 24 has judged that the radio channel should be switched, the control station 24 decides that the radio channel be switched to that of the frequency F2, for example, based on the receiving level information obtained from the mobile station 21, and instructs the exchange 25 to simultaneously transmit the communication signal from the network 26 to both the base station 22 currently communicating with the mobile station 21 and the new base station 23 to which the said mobile station is to be switched. This simultaneous transmission is referred to as multiple transmission. The multiple transmission is carried out by a multiple connection of the lines to both the current base station 22 and the new base station 23 by the exchange 25 in response to an instruction from the control station 24.

A predetermined number of frames after the start of the multiple transmission, the control station 24 specifies, to the mobile station 21 via the current base station 22, the radio channel F2 or the frequency F2 and the time slot to be newly used. This is done using the control bit CTL set in each slot as shown on Row E in FIG. 4. The mobile station 21 responds to this instruction to switch the radio channel to F2 for subsequent transmission and reception. The new base station 23 transmits "0000" to the exchange 25 in place of a received signal in the specified slot until the new base station 23 will be able to receive an effective signal from the mobile station 21 after the start of multiple transmission. That is to say, received information is noise at this time and has no effective contents, accordingly, it is replaced with "0000". When it becomes possible for the new base station 23 to receive an effective communication signal from the mobile station 21 over the radio channel F2, the base station 23 stops the transmission of "0000" and transmits the received communication signal intact to the exchange 25. On the other hand, since the current base station 22 cannot receive a signal, it transmits "0000" to the exchange 25, in place of an information signal, until the multiple transmission ends.

The above-described processing can be implemented by the constant operation of replacing received information with a specified pattern when the signal receiving state of the base station, dependent on the receiving level and the like, does not satisfy certain conditions. The exchange 25 restores the information signal by obtaining the OR of the signals from the current base station 22 and the new base station 23. The operation by which the new base station 23 and the current base station 22 simultaneously receive a signal from the same mobile station 21 as described above is called multiple reception.

By performing the above multiple transmission and multiple reception it is possible to prevent a dropout of the communication signal which is caused by noncoincidence of the timing for switching in the exchange and the mobile station.

Now, a description will be given, with reference to FIG. 7, of an operation for switching to a slot subsequent to that of the radio channel being used for communication, in an embodiment of the radio channel switching method of the present invention.

In the following description the frequency of the radio channel of the current base station 22 is identified by F1 (the frequency of an up link for the transmission from the mobile station 21 to the base station and the frequency of a down link for the transmission from the base station to the mobile station will hereinafter be referred to as a channel frequency), the slot used is identified by S1, and the frequency of the radio channel of the new base station and the slot used are indicated by F2 and S2, respectively.

Figure 7:
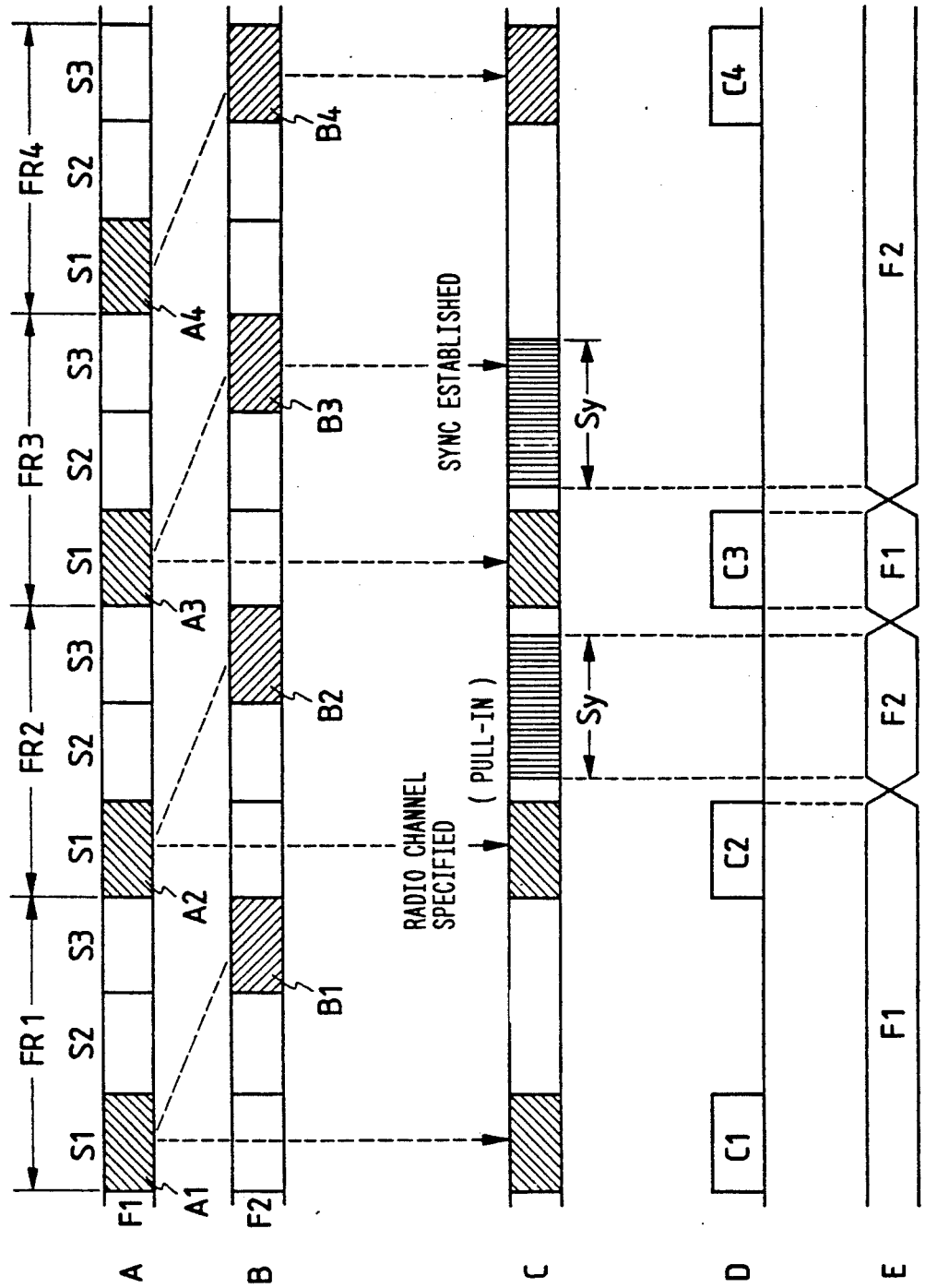
FIG. 7 is a timing chart for explaining the procedure for effecting channel switching to a subsequent slot according to this invention method.

In FIG. 7, Row A shows a transmitted signal of the current base station 21, Row B a transmitted signal of the new base station 23, Row C a received signal of the mobile station 21, Row D a transmitted signal of the mobile station 21 and Row E the frequency of radio equipment of the mobile station 21. The representations on Rows A through E are also the same in FIGS. 8, 10 and 11 described later on.

Since this example employs the three-channel TDMA system, each TDMA frame is composed of three slots, and in this example the current base station 22 uses the slot S1 and the new base station 23 the slot S3.

After it is decided that channel switching is necessary, the exchange 25 and the base stations 22 and 23 start the multiple signal transmission and reception with the frame FR1, for example, and the base station 22 uses the signal A2 of the slot S1 of the frame FR2 to transmit to the mobile station 21 a radio channel specify signal provided from the control station 24. As referred to previously, the radio channel specify signal is added, as the control bit CTL, for example, after the unique word UW of the signal of each slot in the signal configuration shown on Row E in FIG. 4.

Since the multiple transmission starts at the frame FR1 on Rows A and B in FIG. 7, the signals A1 and B1 are the same, the signals A2 and B2 are the same, the signals A3 and B3 are the same, and the signals A4 and B4 are the same.

The mobile station 21 receives the signal of the slot S1 at the frequency F1, and hence receives the signals A1 and A2 but does not receive the signal B1. The mobile station 21 receives the signal A2 from the current base station 22 and responds to the radio channel specify signal in the signal A2 to switch the frequency to F2 in the next slot S2 (see FIG. 7, Row E), immediately entering the pull-in ready state Sy (Row C). In this state Sy the mobile station performs the synchronism establishing operation while receiving the signal B2 at the same time. Once the mobile station thus establishes synchronism, it needs to receive the signals B3, B4, ... of the slot S3 at the frequency F2 thereafter, but if it fails to establish synchronism, the mobile station switches the frequency back to F1 at the end of the frame FR2 and receives the signal A3 of the slot S1 as shown in Row E. Incidentally, the bit phase difference $\Delta Pb$ and the frame phase difference $\Delta Pf$ obtained by the pull-in operation for the channel F2 are retained in that area of the memory 363M corresponding to the new channel F2. In order to ensure that when the channel is switched to the former channel of the frequency F1, synchronism is immediately established to correctly receive the signal A3, the synchronized state information, i.e. the bit phase difference $\Delta Pb$ and the frame phase difference $\Delta Pf$, stored in the memory 363M in FIG. 6 when the channel of the frequency F1 was used first, are read out and set in the clock phase shifter 365 and the frame phase shifter 368, respectively. By this setting, the receiving circuit of the mobile station can immediately establish synchronism with the signal A3 from the new base station 22, and hence it can receive the signal A3 correctly with no dropout.

After the reception of the signal A3 the mobile station 21 switches the channel frequency again to F2 and enters the pull-in ready state Sy, acquiring synchronism with the signal B3 from the new base station 23. The switching to the channel frequency F2 takes place after the bit phase difference $\Delta Pb$ and the frame phase difference $\Delta Pf$ stored in the memory 363M during the previous pull-in operation for the channel frequency F2 are read out therefrom and set in the clock phase shifter 365 and the frame phase shifter 368, respectively. By this, synchronism with the channel frequency F2 can be established more quickly.

FIG. 7 shows the case where the synchronism could be established by the pull-in operation in the frame FR3, and the mobile station uses the frequency F2 and the slot S3 to communicate with the new base station 23 in and after the frame FR4 as depicted on Row E. The control station 24 instructs the exchange 25 to stop the multiple connection after making sure that the state of synchronism has stably been held over a predetermined number of frames.

Next, a description will be given of an operation for switching to a slot preceding that of the radio channel being currently used.

Figure 8:
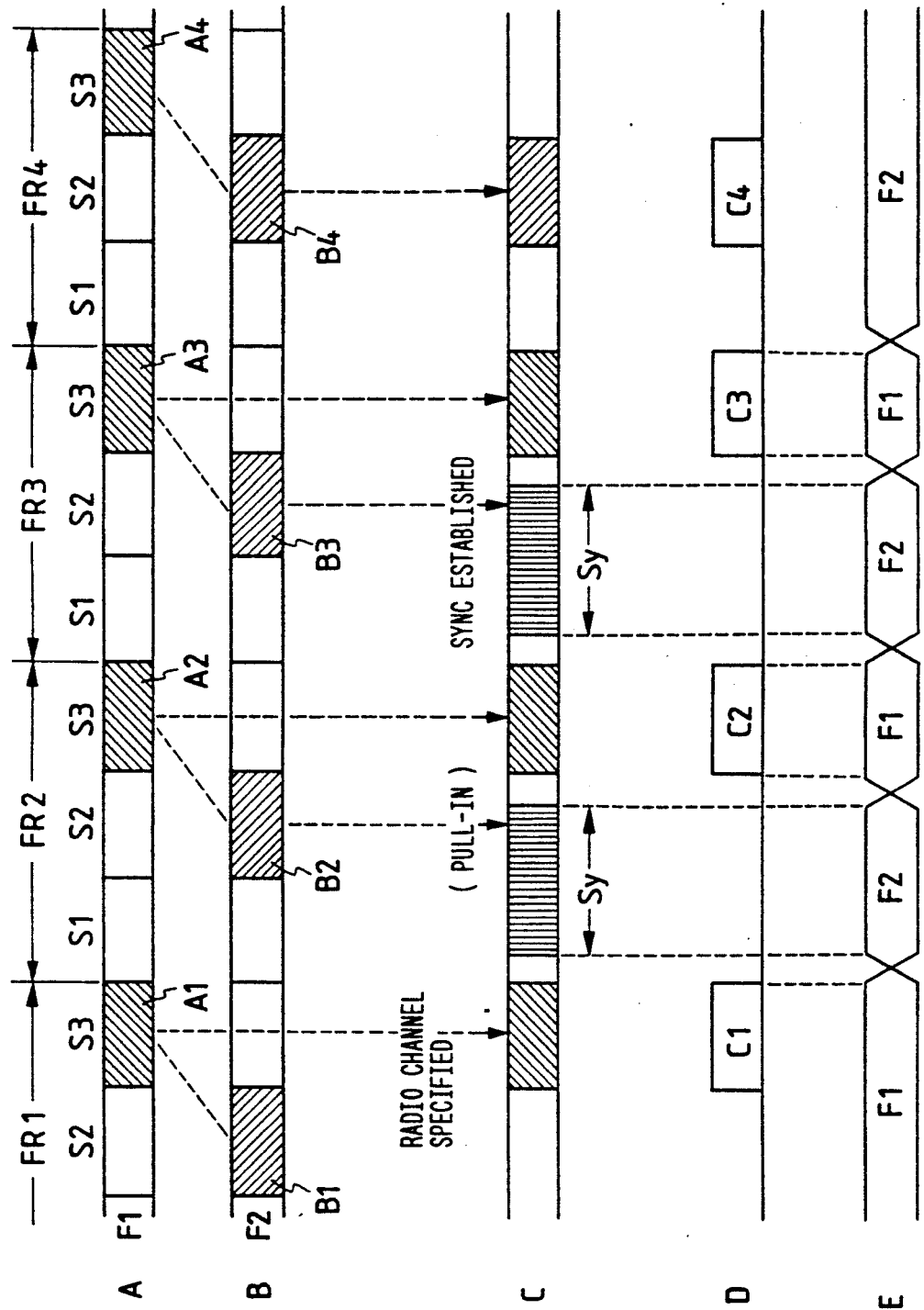
FIG. 8 is a timing chart for explaining the procedure for effecting channel switching to a previous slot.

Now, let the radio channel frequency and the slot of the current base station be represented by F1 and S3 and the radio channel frequency and the slot of the new base station be represented by F2 and S2. FIG. 8 shows examples of signals in such a case. In frames FR1 through FR4 the multiple transmission and reception are performed; therefore, the base station transmitting signals A1 and B1 are the same communication signal and the same is true of the frames FR2 to FR4. The FIG. 8 example of the channel switching control method of the present invention differs from the FIG. 7 example in that in the former the signals B1, B2, ... B4 from the new base station are transmitted prior to the transmission of the signals A1, A2, ... A4 from the current base station 22 in the frames FR1 through FR4.

As is the case with the FIG. 7 example, the control station 24 recognizes the necessity for the radio channel switching and decides the new radio channel, after which the exchange 25 and the base stations 22 and 23 begin multiple signal transmission and reception as referred to previously. Following this, the current base station 22 specifies the new radio channel to the mobile station 21 in the frame FR1. The mobile station receives the signal A1 containing the control bit CTL, at the frequency F1 and in the slot S1. As shown on Row C, the mobile station receives the signal A1 and responds to the radio channel specify signal to switch the channel frequency to F2 (Row E), with the stored information on the state of synchronism with the current base station 22 retained intact as in the above-described example. Then, in the frame FR2 the mobile station performs the pull-in operation Sy for the signal B2 being transmitted from the new base station 23.

This example shows the case where no synchronism could be established by the pull-in operation, and also in this example, the bit phase difference $\Delta Pb$ and the frame phase difference $\Delta Pf$ during the pull-in operation are retained in the address area of the memory 363M corresponding to the channel F2. Next, the mobile station reads out the synchronized state data for the channel F1 from the memory 363M and sets it in the bit/frame synchronization circuit 36, thereafter switching the channel to F1 and receiving the signal A2. In the frame FR3 the mobile station reads out the synchronized state information for the channel F2 from the memory 363M and sets it in the synchronizing circuit 36, after which the mobile station switches the channel to F2 again and performs the pull-in operation for the signal B3 from the base station 23. In the FIG. 8 example the mobile station is synchronized with the signal B3. Consequently, if the mobile station still continues to use the channel F2 thereafter, then it cannot receive the signal A3 from the current base station 22 in the frame FR3. On the other hand, the signal B3 of the same contents as those of the signal A3 was used for the pull-in operation, and hence was not received as a communication signal. In other words, neither of the signals A3 and B3 can be received in the frame FR3. To avoid such a signal dropout, it is necessary for the mobile station to receive the signal A3. To perform this, even when the mobile station is synchronized with the signal B3, it reads out again the synchronized state data on the channel F1 from the memory 363M, sets it in the bit/frame synchronizing circuit 36, switches the channel to F1 and then receives the signal A3 thereon. Following this, the mobile station reads out again the synchronized state data on the channel F2 from the memory 363M in the frame FR4 and sets it in the synchronizing circuit 36, then switches the channel to F2.

In and after the TDMA frame FR4 in which synchronism has thus been established, the mobile station communicates with the new base station 23 over the radio channel F2. As compared with the case of FIG. 7, the FIG. 8 example calls for one more switching of the radio channel back to F1, because the slot of the new channel precedes the slot of the current channel.

After completion of the radio channel switching is confirmed, the multiple transmission and reception are stopped and the old line and the old radio channel are released, with which the radio channel switching control operation ends.

Figure 9:
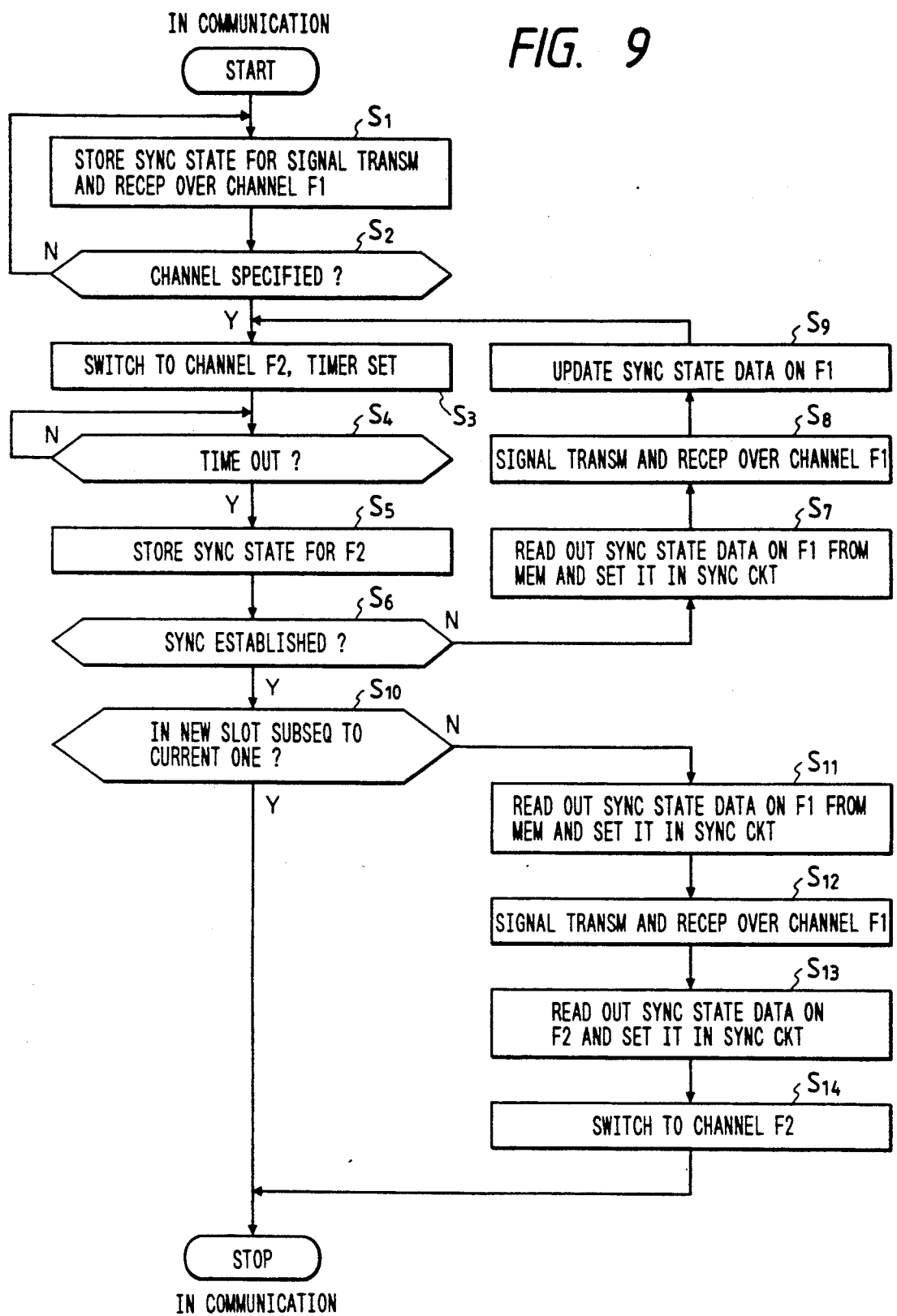
FIG. 9 is a flowchart showing a channel switching control operation in the mobile station.

While the radio channel switching control operations have been explained separately in accordance with the temporal relationships between the slot of the current channel F1 and the slot of the new channel F2 in FIGS. 7 and 8, a flowchart of the radio channel switching control operation of the mobile station 21 is shown in FIG. 9 in common to the FIGS. 7 and 8 example.

Step $S_1$: The mobile station 21 transmits a signal to and receives a signal from the base station 22 over the channel F1 and stores synchronized state data for the channel F1 in the memory 363M at the corresponding address.

Step $S_2$: The mobile station checks the received signal for a channel specify signal, and if it is not found, the process returns to step $S_1$, and when it is found, then the process proceeds to step $S_3$.

Step $S_3$: The mobile station switches the channel to the specified channel F2 and sets a pull-in operation period in a timer.

Step $S_4$: The mobile station waits until the pull-in operation period comes to an end.

Step $S_5$: The mobile station stores the synchronized state for the channel F2 in the memory 363M.

Step $S_6$: The mobile station checks whether or not synchronism with the channel F2 has been established, and if not, then the mobile station executes the following steps $S_7$, $S_8$ and $S_9$ and again executes steps $S_3$, $S_4$, $S_5$ and $S_6$. When the synchronism is established, the process proceeds to step $S_{10}$.

Step $S_7$: The mobile station reads out the synchronized state data on the channel F1 from the memory and sets it in the synchronizing circuit.

Step $S_8$: The mobile station switches the channel to F1 and performs signal transmission and reception over the channel F1.

Step $S_9$: The mobile station updates the synchronized state data on the channel F1 in the memory.

Step $S_{10}$: The mobile station checks whether the slot of the specified new channel precedes or succeeds the slot of the current channel. If the former precedes the latter, then the mobile station holds communication over the channel F2, and if the former succeeds the latter, then the process proceeds to step $S_{11}$.

Step $S_{11}$: The mobile station reads out the synchronized state data on the channel F1 from the memory and sets it in the synchronizing circuit.

Step $S_{12}$: The mobile station switches the radio channel to F1 and performs signal transmission and reception.

Step $S_{13}$: The mobile station reads out the synchronized state on the channel F2 from the memory and sets it in the synchronizing circuit.

Step $S_{14}$: The mobile station switches the radio channel to F2 and holds communication.

By effecting such control as mentioned above, it is possible for the mobile station to establish the bit/frame synchronization for receiving signals from the new base station 23, without interrupting the communication with the current base station 22, and open up communication with the new base station 23.

Figure 10:
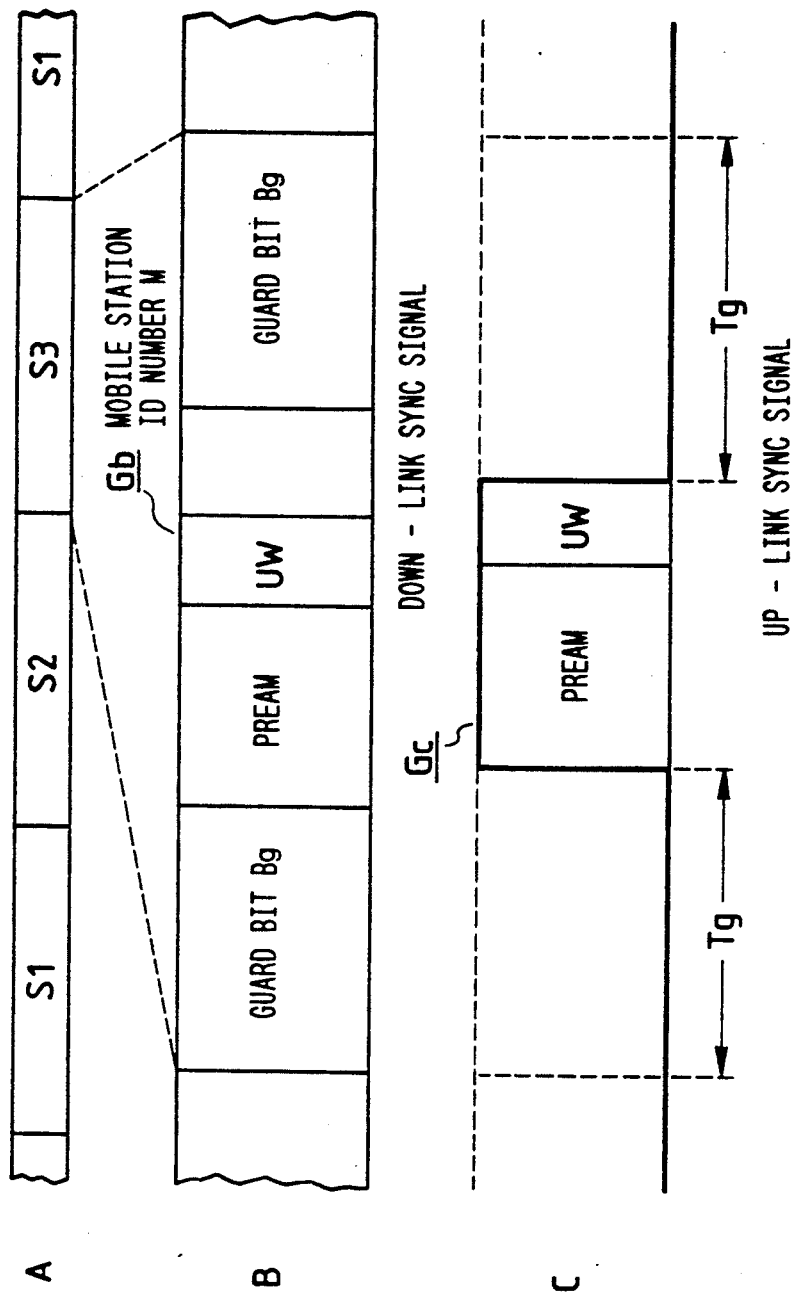
FIG. 10 is a diagram showing the configuration of a synchronizing signal.

Next, a description will be given of a modified form of the above-described embodiment.. In the above embodiment, when it is difficult for the new base station 23 to establish high-speed receiving synchronization with a signal C4, for example, shown on Rows D in FIGS. 7 and 8, which is transmitted from the mobile station 21 for the first time, it is effective to employ a radio channel switching control method according to which the mobile station 21 transmits a synchronizing signal to the new base station 23 after establishing synchronization with a signal transmitted from the new base station 23 and then the mobile station ends the radio channel switching process after establishment of synchronization in the new base station. In FIG. 10 Row B shows the configuration of a synchronizing signal (a down-link synchronizing signal) Gb' which is inserted into the slot S3 of a signal which is transmitted from the new base station 23, shown on Row A, and Row C shows the configuration of a synchronizing signal (an up-link synchronizing signal) Gc which is transmitted from the mobile station 21 to the new base station 23. Either signal includes a preamble for clock regeneration use and a unique word (UW) for identifying the slot number and the synchronizing signal.

Interference with the adjoining slots S1 and S3 which are used by other mobile stations is prevented by providing a guard time Tg before and after the up-link synchronizing signal Gc as shown on Row C in FIG. 10. Further, by providing guard bits Bg before and after the down-link synchronizing signal Gb as shown on Row B, it is possible to transmit and receive the synchronizing signals regardless of the frame phase difference between the current and new base stations and the time for frequency switching between them.

In the radio channel switching operation, if the mobile station starts transmission at a wrong frequency, it is likely to disturb other communications. When it is necessary to carry out a safe procedure as of confirming the radio channel specified for radio channel switching, it is effective to employ a method according to which the new base station transmits a specific signal indicating the new channel and the mobile station identifies the transmitted specific signal and then perform the channel switching operation.

In this instance, the specific signal acts as a synchronizing signal. The channel switching operation can be effected with higher certainty by a method in which the new base station transmits a mobile station identification number M for identifying the mobile station transmitting over the new radio channel, together with the above-mentioned specific signal, i.e. the synchronizing signal Gb, as shown on Row B in FIG. 10, for example, and the mobile station identifies the above-said number to thereby confirm the new radio channel.

Either one of the mobile station and the control station decides, as the mobile station identification number M, the mobile station number, a part of it, or a random value. In the case of the control station, it transmits the mobile station identification number M to both the current and new base stations, together with the channel specify signal for the mobile station, and the current base station indicates the number M to the mobile station, together with the channel specify signal.

An example in which the new base station transmits the aforementioned specific signal in the channel switching operation will be described.

Figure 11:
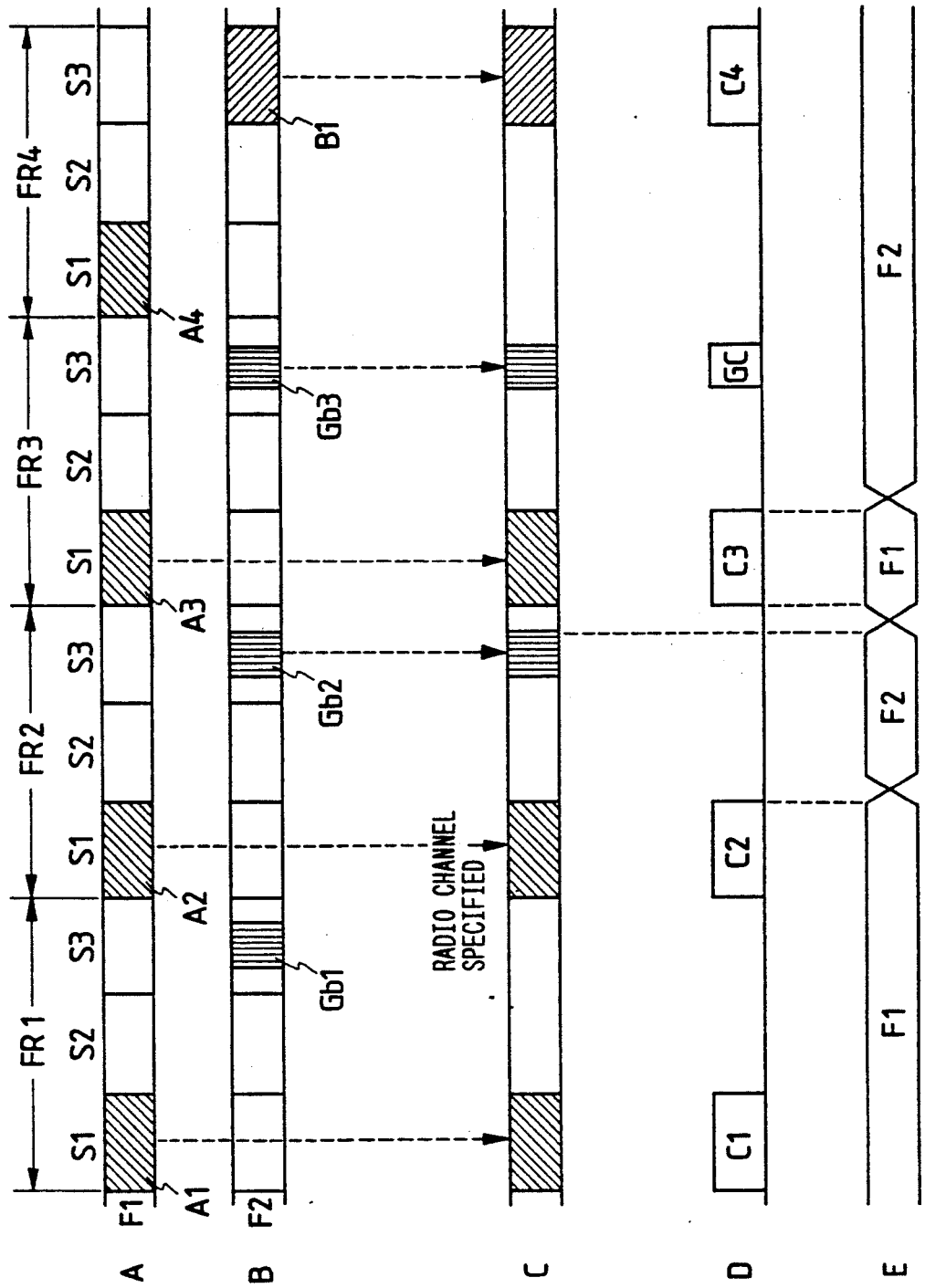
FIG. 11 is a timing chart showing the procedure in the case where the synchronizing signal is used in FIG. 7.

A description will be given first, with reference to FIG. 11, of an operation for switching to a slot subsequent to that of the radio channel being currently used. In FIG. 11, row A shows a signal transmitted from the current base station 22, Row B a signal transmitted from the new base station 23, Row C a signal received by the mobile station 21, Row D a signal transmitted from the mobile station 21 and Row E the channel frequency used by the mobile station 21. The frequency and the slot of the current radio channel are indicated by F1 and S1, respectively, and the frequency and the slot of the new channel are indicated by F2 and S3, respectively.

As is the case with the FIG. 7 embodiment, after the control station judges that the radio channel be switched and then decides the new radio channel, the exchange 25 performs the multiple connection from the network 26 to the current and new base stations 22 and 23 as referred to previously, and in this instance, the new base station 23 transmits down-link synchronizing signals Gb1, Gb2, ..., in place of communication signals from the exchange 25, until synchronization is established in the new base station. The current base station 22 specifies a new radio channel to the mobile station 21, together with the signal A2, for instance. Upon detecting the radio channel specify signal from within the signal A2 received from the current base station 22, the mobile station 21, still storing the synchronized state information on the current base station 22, immediately switches the radio channel frequency to F2, receives the down-link synchronizing signal Gb2 being transmitted from the new base station 23, establishes the bit synchronization and the frame synchronization based on the detection of the unique word, confirms the mobile station identification number M and then stores the synchronized state information on the new base station 23. In the example of FIG. 11 the mobile station 21 has established synchronization with the synchronizing signal Gb2 from the new base station 23, but the new base station 23 has not yet established synchronization with the mobile station 21. Accordingly, the mobile station 21 transmits the synchronizing signal Gc to the new base station 23 in the specified slot S3 of the frame FR3 but, prior thereto, it has to receive the communication signal A3 from the current base station 22. To this end, the mobile station 21 reads out the synchronized state data on the channel F1 from the memory and sets it in the synchronizing circuit 36 and, at the same time, switches the frequency back to F1 and receives the signal A3.

Upon receiving the signal A3, the mobile station immediately switches the channel frequency to F2 and transmits the up-link synchronizing signal Gc.

Having established synchronization with the synchronizing signal Gc, the new base station 23 starts transmission of the communication signal B1 from the exchange 25 in the next TDMA frame FR4, instead of sending the down-link synchronizing signal. The mobile station 21 also starts, in the frame FR4, transmission of the communication signal C4 at the frequency F2 and in the slot S3. After the completion of the radio channel switching is confirmed, the multiple transmission and reception are finished to release the circuit and the radio channel of the current base station 22 putting an end to the radio channel switching control operation.

Figure 12:
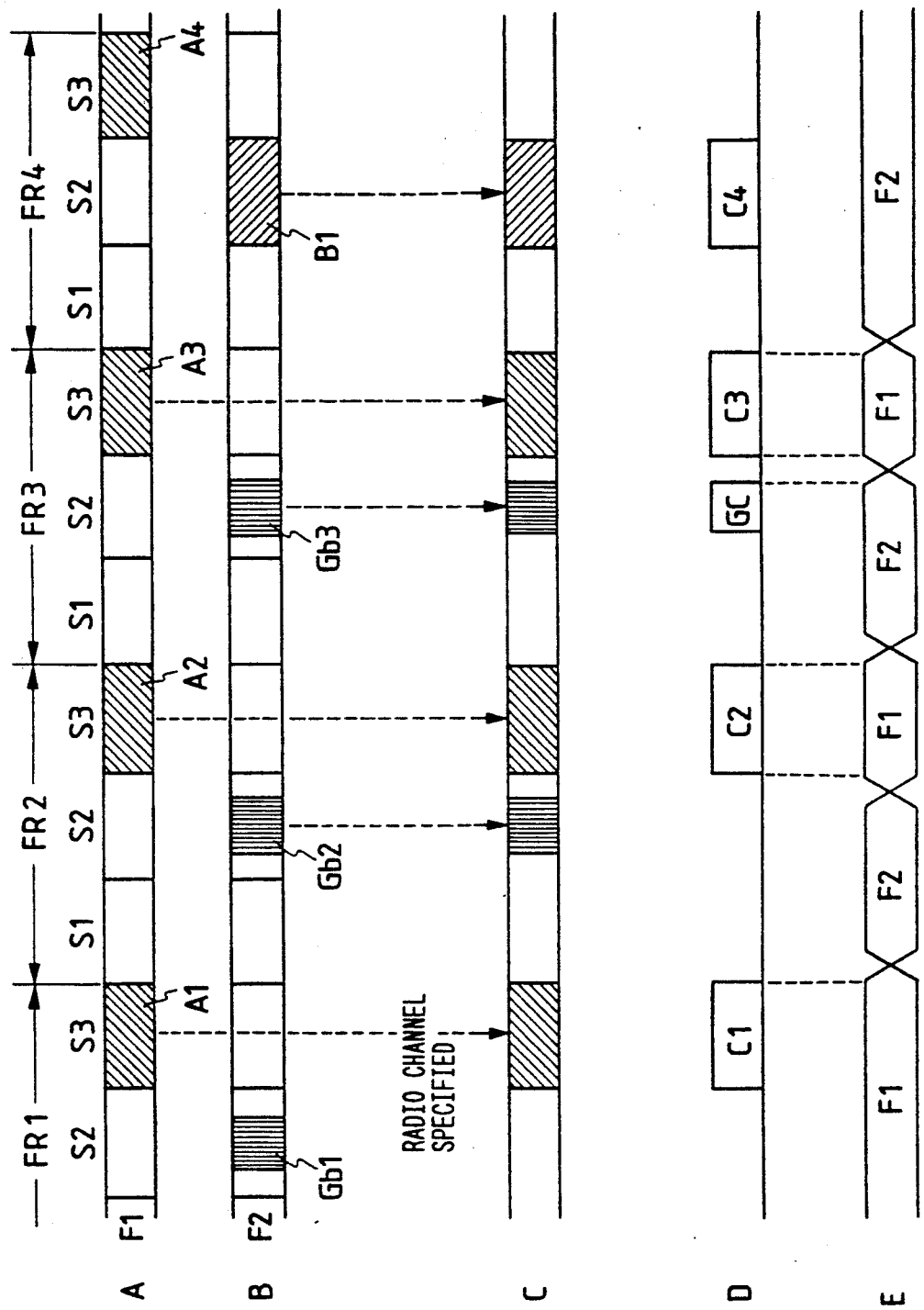
FIG. 12 is a timing chart showing the procedure in the case where the synchronizing signal is used in FIG. 8.

FIG. 12 shows the control operation for switching to a slot preceding that of the radio channel being currently used as in the case where the frequency of the current radio channel is F1, the current slot is S3, the frequency of the new radio channel is F2 and the new slot is S2.

This channel switching control operation can easily be understood from the description given above with respect to FIGS. 8 and 11, and hence it will not be described in detail.

While FIGS. 11 and 12 show an example in which the up-link synchronizing signal Gc is transmitted only once, it is also possible to transmit the up-link synchronizing signal Gc a plurality of times by repeating the pattern of the frame FR3 a fixed number of times according to the synchronizing method used and the reliability of the signal transmission before the frame FR4 which is a pattern for the completion of the switching operation. By continuing the multiple transmission and reception from a time before specifying the radio channel to the mobile station to the time when the new base station receives, for example a channel switching end signal from the mobile station, the multiple connection can be stopped in a desired frame thereafter—this permits the above-mentioned switching control without the necessity of strictly controlling the timing for the channel switching of the mobile station. Further, the timing for the channel switching of the mobile station may also be indicated to the new base station by adding the up-link synchronizing signal Gc with the remaining number of transmissions for synchronization.

In the case of effecting such radio channel switching control as described above with respect to FIGS. 7, 8, 11 and 12, the radio channel switching is impossible when an idle slot in the new frequency channel assumes the same position as the slot of the current frequency channel on the time axis.

In such an instance, since slot replacement in the same frequency channel of the same transmitter-receiver is relatively easy because synchronization need not be re-established therefor, it is possible to effect the switching control described in respect of FIGS. 7, 8, 11 and 12 by performing the channel switching after replacing the slot with another idle one in the new base station or replacing the slot with another in the current base station. When the slot replacement in the same frequency channel is likely to cause a dropout of the communication signal, the channel switching control method described above in connection with FIGS. 7, 8, 11 and 12 may also be employed.

FIGS. 13A and 13B are diagrams each showing an example of slot replacement for providing a slot arrangement which permits channel switching, FIG. 13A showing the slot replacement in the new base station and FIG. 13B the slot replacement in the current base station. In FIGS. 13A and 13B reference character A denotes the slot used by the mobile station which switches the radio channel.

In the case where the slot now in use is S1 and the new frequency channel F2 is also occupied except in the slot S1 as shown in State ST1 in FIG. 13A, the slot S3 in the new frequency channel F2 is replaced with the slot S1 to make the former idle to thereby prevent the slots of the current and new frequency channels from assuming the same position on the time axis, as shown in State ST2, and then the current radio channel is switched as shown in State ST3.

In the case where the slot now in use is S2, the new radio channel is also occupied except in the slot S2 and the slot S3 of the current radio channel is idle as shown in State ST1 in FIG. 13B, the slot S2 in the current radio channel is switched to the slot S3 which does not occupy the same position as the idle slot of the new radio channel on the time axis, as shown in State ST2, and then the current radio channel is switched to the new channel as shown in State ST3.

In the switching control that includes the slot replacement in the radio channel switching procedure, the following control method is effective in solving a problem which is posed by an excess of control loads over the performance or capacity of the control station during the radio channel switching, or in minimizing the time for radio channel switching.

That is, when mobile stations which are using respective slots in the same frequency channels are each controlled by the control station in such a manner that whenever a slot preceding the one now in use becomes idle, the mobile station is immediately switched to the idle slot, the probability of the succeeding slot becoming idle is increased, making it possible to decrease the probability of slots in the current and new channels occupying the same position on the time axis. This affords reduction of the probability of involving the slot replacement in the radio channel switching operation. By performing the slot replacement only when slots of the both channels assume the same position on the time axis in spite of such control as mentioned above, it is possible to decrease the control loads during the radio channel switching and carry out high-speed radio channel switching.

Two examples of slot replacement are shown in FIGS. 14A and 14B. When communication in the slot S2 comes to an end among slots S1, S2 and S3 occupied in the same frequency channel as shown in State ST1 in FIG. 14A, the mobile station in communication in the slot S3 is switched to slot S2 as shown in State ST2 to release slot S3, thus making the succeeding slot idle as shown in State ST3.

Also when communication in slot S1 ends in the case where only slots S1 and S2 have been used for communication as shown in State ST1 in FIG. 14B, slot S2 is switched to the idle one S1 as shown in State ST2, making the succeeding slot idle as shown in State ST3. It is also effective to employ a method by which occupied slots are sequentially switched to succeeding slots to make the preceding slots idle.

In the above radio channel switching operation, in the case where synchronization is not established among the base stations or is incomplete, and if a frame timing difference and a transmission delay time difference are large, the base station receives a signal from the mobile station prior to the channel switching and decides a slot to which the mobile station can be switched. In the case where such a procedure is difficult and the mobile station cannot switch to the slot specified by the base station, it is possible to allot a slot to which the mobile station can be switched, by a method in which the mobile station indicates a slot that is available for switching to the base station and the base station selects a radio channel in which the indicated slot can be used and then allots the radio channel to the mobile station, or a method in which the mobile station informs the base station to the effect that it cannot switch to the specified slot, and the base station infers from the position of the slot allotted previously a slot for the switching thereto of the mobile station and allots again another radio channel to the mobile station.

While the radio channel switching operation is repeated, the current and new base stations can judge a slot arrangement available for switching, based on switching information provided from the mobile station, and consequently, it is also possible for either base station to assign a switching available slot in advance.

Moreover, such a switching available slot can also be assigned from the base station side through use of a method in which the mobile station receives a control channel or suitable communication channel of the new base station within an idle time slot, detects a switching available slot from the frame timing of the new base station and indicates the switching available slot to the new base station.

The above description has been given of the case where each mobile station employs the same slot for both transmission and reception, but also when different slots are used for transmission and reception or when the frame timing of a signal from the base station to the mobile station and the frame timing of a signal from the latter to the former do not coincide, the above-described control can be effected by switching the channel frequency individually for transmission and reception.

While in the above the channel switching control method of the present invention has been described in connection with the case of switching the mobile station to the radio channel of a different base station, it is evident that the method is also applicable to the switching of the mobile station between a plurality of radio channels assigned to the same base station.

That is, the mobile communication system is designed so that when the radio channel occupied for communication cannot be used due to interference by a jamming signal, a multiple-reflected signal, etc., it can be switched to another channel in the same zone. To this end, each zone is assigned a plurality of frequency channels and the base station in each zone is provided with plural pieces of radio equipment corresponding to the frequency channels assigned to the zone. Such intra-zone channel switching is carried out by switching the radio equipment in the base station and the frequency channel in the mobile station.

Through utilization of the fact that pieces of radio equipment of the current and new radio channels are provided in the same base station, and in accordance with the second aspect of the present invention described hereinbelow, such intra-zone channel switching can also be implemented at high speed without the repetition of switching between the two frequency channels until the completion of the radio channel switching as in the above-described switching control method.

Figure 15:
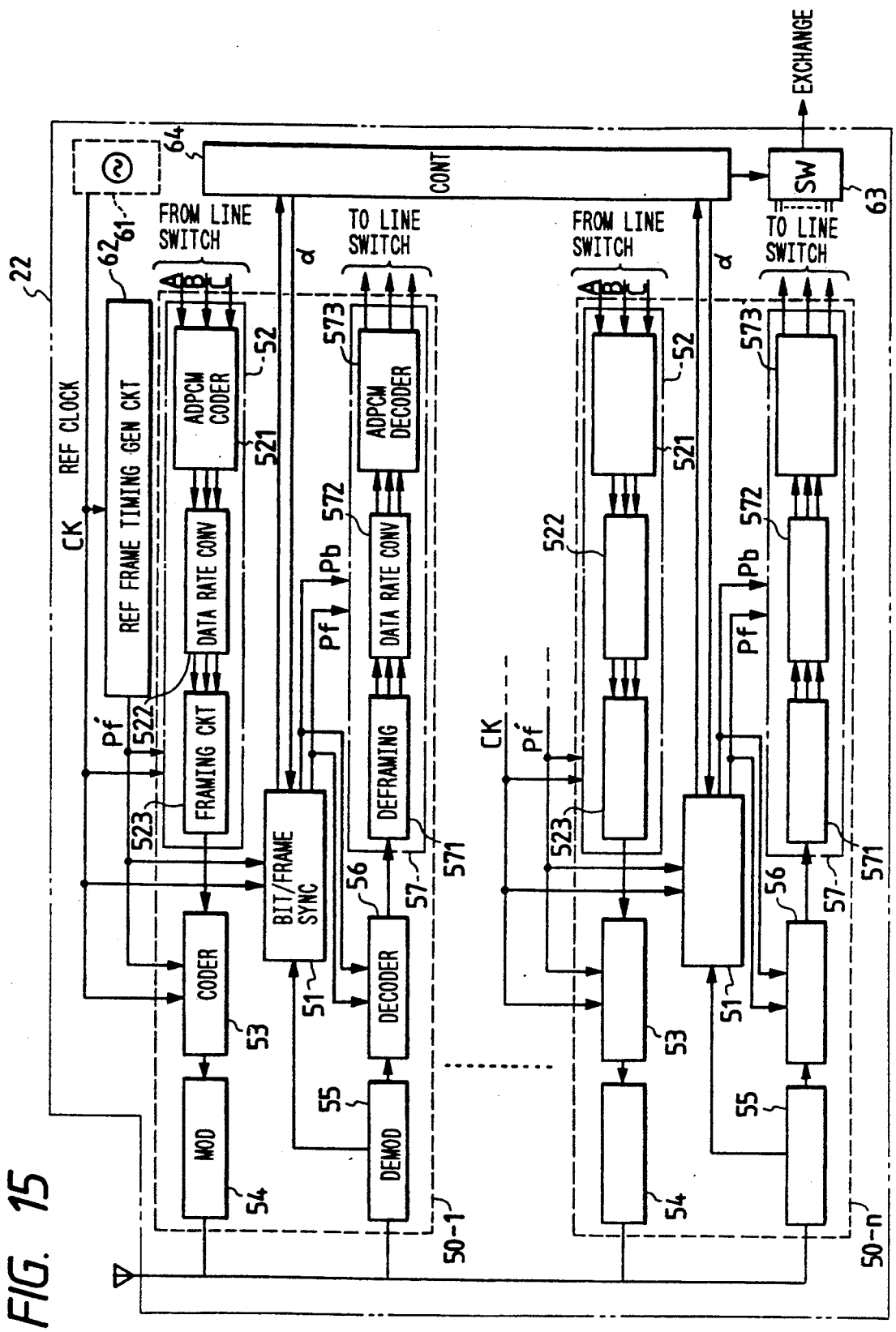
FIG. 15 is a block diagram illustrating the construction of a base station which effects intra-zone channel switching.

FIG. 15 is a block diagram illustrating an example of the construction of, for instance, the base station 22 in FIG. 3 which permits the intra-zone channel switching. Reference numerals 50-1 to 50-n indicate pieces of radio equipment each corresponding to one frequency channel, 61 a reference clock generator, 62 a reference frame timing generator, 63 a line switch, and 64 a controller. The pieces of radio equipment 50-1 to 50-n each include a bit/frame synchronizing circuit 51, a multiplexing part 52, a coder 53, a modulator 54, demodulator 55, a decoder 56 and a demultiplexing part 57.

The reference clock generator 61 generates a reference clock CK, and based on this reference clock, the reference frame timing generator 62 generates reference frame timing Pf'. The reference clock CK and the reference frame timing Pf' are provided to all the pieces of radio equipment 50-1 to 50-n in common to them.

As shown in FIG. 15, the multiplexing parts 52 and demultiplexing parts 57 each have three channels between it and the line switch 63, indicating that this is a three-channel TDMA system. Accordingly, the pieces of radio equipment 50-1 to 50-n handle signals of the same configurations as depicted in FIG. 4.

In the multiplexing part 52, when three communication signals A, B and C supplied thereto via the line switch 63 are analog signals, they are converted through ADPCM conversion by an ADPCM coder 521 into three digital signals, and when the three input communication signals are digital signals, they are held intact. Then these digital signals are each time compressed by a data rate converter 522 into a one-slot length for each predetermined length, and in a framing circuit 523 the time-compressed signals are inserted into first, second and third slots of each TDMA frame to form a multiplexed signal of the TDMA frame.

The multiplex signal from the multiplexing part 52 is coded by the coder 53 into an error correcting code, which is applied to the modulator 54, in which it modulates a channel frequency carrier for transmission to the mobile station. The multiplexing parts 52 and the coders 53 operate in synchronism with the reference clock CK and the reference frame timing Pf'. Each demodulator 55 demodulates a signal received from the mobile station and outputs a detected signal. The detected output is provided to the bit/frame synchronizing circuit 51, in which a clock Pb and frame timing Pf synchronized with the received signal are recovered. The detected output is also applied to the decoder 56, wherein the error correcting code is decoded. In the demultiplexing part 57 the first, second and third frames in each TDMA frame are separated by a deframing circuit 571, each slot is time expanded by a data rate converter 572 and then converted into a digital signal, thereafter being output. the three communication signals thus separated are transmitted via the line switch 63 to the exchange 25 (FIG. 3). The decoder 56 and the demultiplexing part 57 operate in synchronism with the clock Pb and the frame timing Pf recovered by the bit/frame synchronizing circuit 51.

As in the case of FIG. 5, the bit/frame synchronizing circuit 51 is constructed so that the bit phase difference ΔPb and the frame phase difference ΔPf indicating the state of synchronization with the mobile station can be set as parameters and fetched for storage. That is, the bit/frame synchronizing circuit 51 is supplied with the reference clock CK, the reference frame timing Pf' and the detected signal R and outputs the recovered clock Pb and the recovered frame timing Pf and, at the same time, can output, as parameters, phase differences between them and the reference clock CK and the reference frame timing Pf'. Further, supplied with such phase differences, as parameters, from the controller, the bit/frame synchronizing circuit 51 is capable of effecting bit/frame phase control, using the parameters as initial values.

Figure 16:
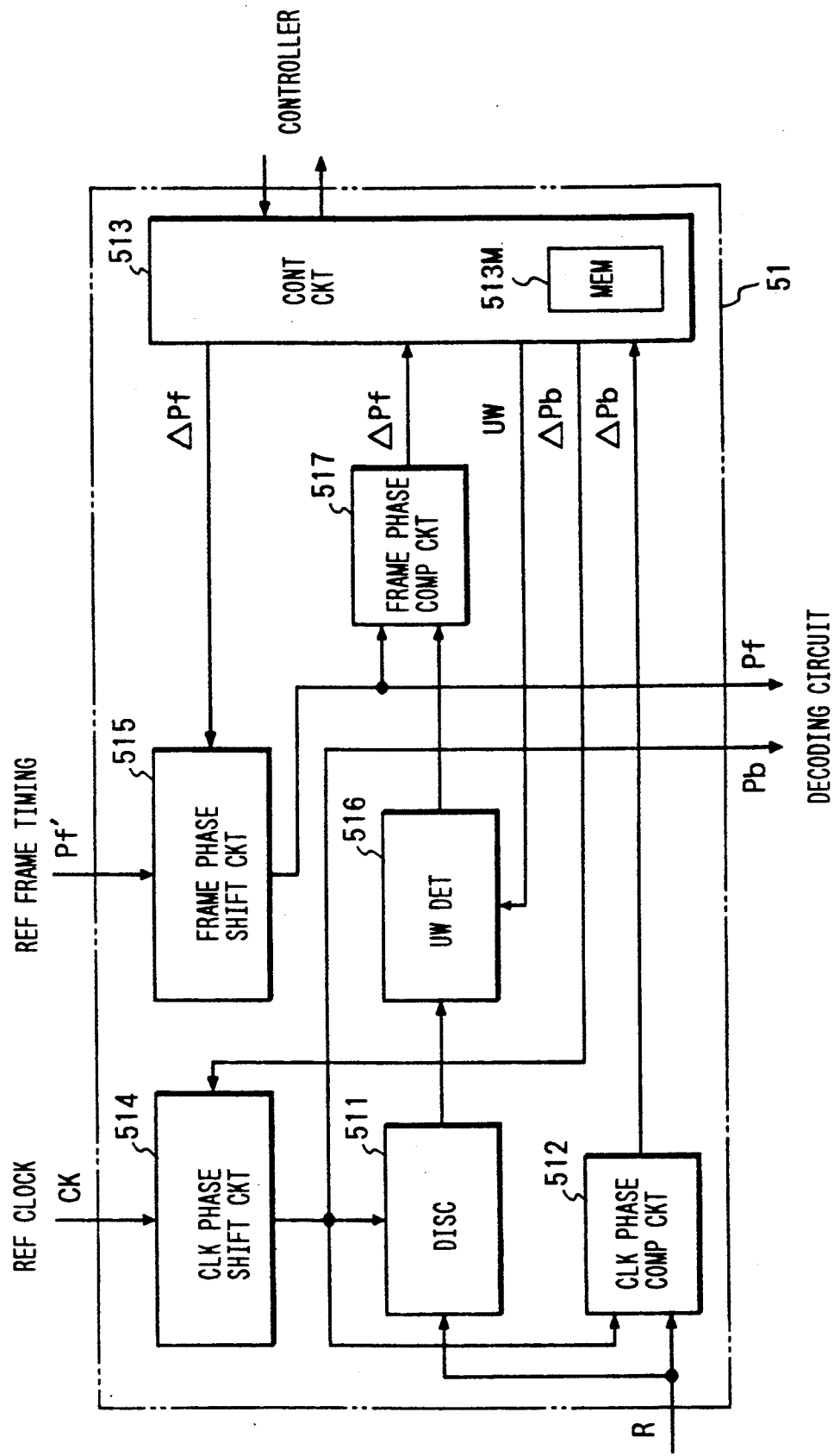
FIG. 16 is a block diagram of a bit/frame synchronizing circuit in each radio communication equipment in FIG. 15.

FIG. 16 is a diagram illustrating an example of the construction of each bit/frame synchronizing circuit 51, which includes a discriminator 511, a clock phase comparator 512, a control circuit 513, a clock phase shifter 514, a frame phase shifter 515, a unique word detector 516 and a frame phase comparator 517. This example is exactly identical in construction with that shown in FIG. 6 except in that the reference clock CK and the reference frame timing Pf' are provided from the external reference clock generator 61 and the external reference frame timing generator 62, respectively.

The clock phase shifter 514 and the frame phase shifter 515 delay the reference clock CK and the reference frame timing Pf' for a period of time corresponding to a parameter of a phase difference set by the control circuit 513 to recover the clock Pb and the frame timing Pf, which are provided to the decoder 53 and the demultiplexing part 57.

Moreover, the recovered clock Pb is provided to the clock phase comparator 512, wherein it is compared in phase with the detected signal R from the demodulator 55, and the compared output (the bit phase difference ΔPb) is provided to the control circuit 514 and is stored in a memory 513M and, at the same time, it is set in the clock phase shifter 514. On the other hand, the detected signal R is discriminated by the discriminator 511 at the timing of the recovered clock CK, and each time the unique word UW of the assigned slot is detected by the unique word detector 516 from a discriminated bit stream, a frame pulse is generated. This frame pulse is phase compared by the frame phase comparator 517 with the frame timing Pf from the frame phase shifter 515, and the resulting phase difference ΔPf is provided to the control circuit 513 for storage in the memory 513M and at the same time it is set in the frame phase shifter 515. In this way, the bit/frame synchronizing circuit 51 synchronizes the input reference clock CK and the input reference frame timing Pf' with the received signal and stores in the memory 513M the bit phase difference (i.e. the clock phase difference) ΔPb and the frame phase difference ΔPf which are parameters representing their synchronized state, these parameters being updated at all times. The thus synchronized reference clock (i.e. the recovered clock) Pb and the thus synchronized reference frame timing (i.e. the recovered frame timing) Pf are provided to the decoder 56, wherein the detected signal from the demodulator 55 is discriminated at correct timing and the error correcting code is decoded.

Next, a description will be given of the intra-zone channel switching procedure.

Now, consider the case where in the system configuration of FIG. 3 the frequency F1 at which the mobile station is in communication with the radio equipment in the base station 22, shown in FIG. 15, cannot be used due to interference or the like and the radio channel is switched to the frequency F2.

When the controller 64 judges it necessary to effect the intra-zone channel switching and decides a new radio channel, the controller 64 reads out the synchronized state parameters ΔPb and ΔPf stored in the memory 513M of the bit/frame synchronizing circuit 51 of the current radio equipment 50-1 (FIG. 14) and sets them in, for example, the clock phase shifter 514 and the frame phase shifter 515 of the bit/frame synchronizing circuit 51 of a new radio equipment 50-n. In the current radio channel the new radio channel is specified to the mobile station 21. Based on this, the mobile station 21 switches the radio channel in an idle time slot (which will be described later on). The bit/frame synchronizing circuit 51 of the new radio equipment 50-n starts reception, using the clock and the frame timing recovered on the basis of the synchronized state parameters set by the controller 64 through the control circuit 513, and consequently the current radio channel is freed.

Such control as mentioned above enables the mobile station 21 to establish synchronization with the new radio equipment 50-n for communication therewith without interrupting communication with the current radio equipment 50-1.

Figure 17:
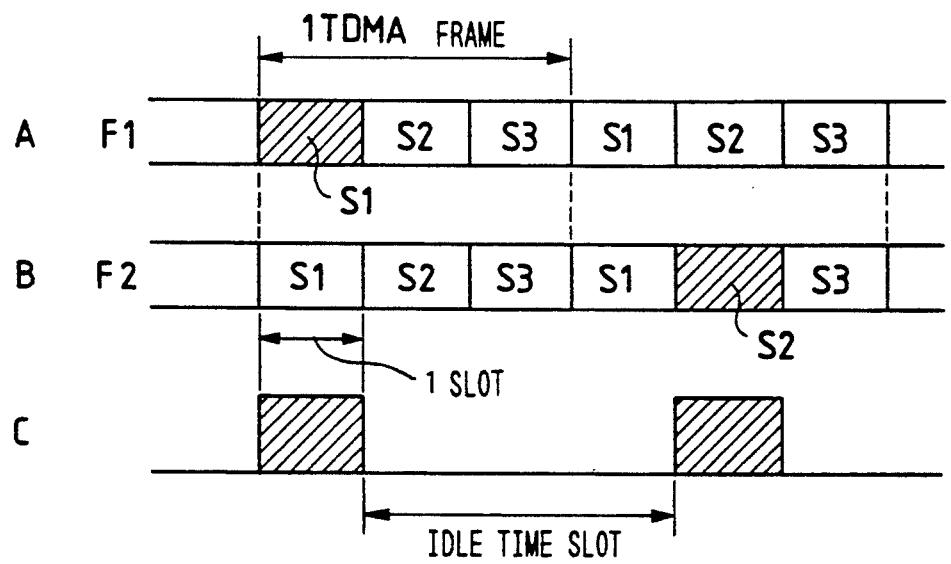
FIG. 17 is a diagram explanatory of an idle time slot for the intra-zone channel switching.

FIG. 17 is a diagram explanatory of the afore-mentioned idle time slot. In FIG. 17, for example, in the case of switching the current channel (frequency F1, slot S1) shown on Row A to the new channel (frequency F2, slot S2) shown on Row B, the mobile station 21 switches the channel in an idle time slot between the slot S1 before switching of its transmission signal and the slot S2 after the signal switching, shown on Row C.

By the multiple connection of both the up and down line switches 63 (FIG. 15) to the current radio equipment and the new radio equipment after the decision of the new radio channel in the intra-zone channel switching operation, it becomes easier to free the channel switching from momentary interruption of communication.

Figure 18:
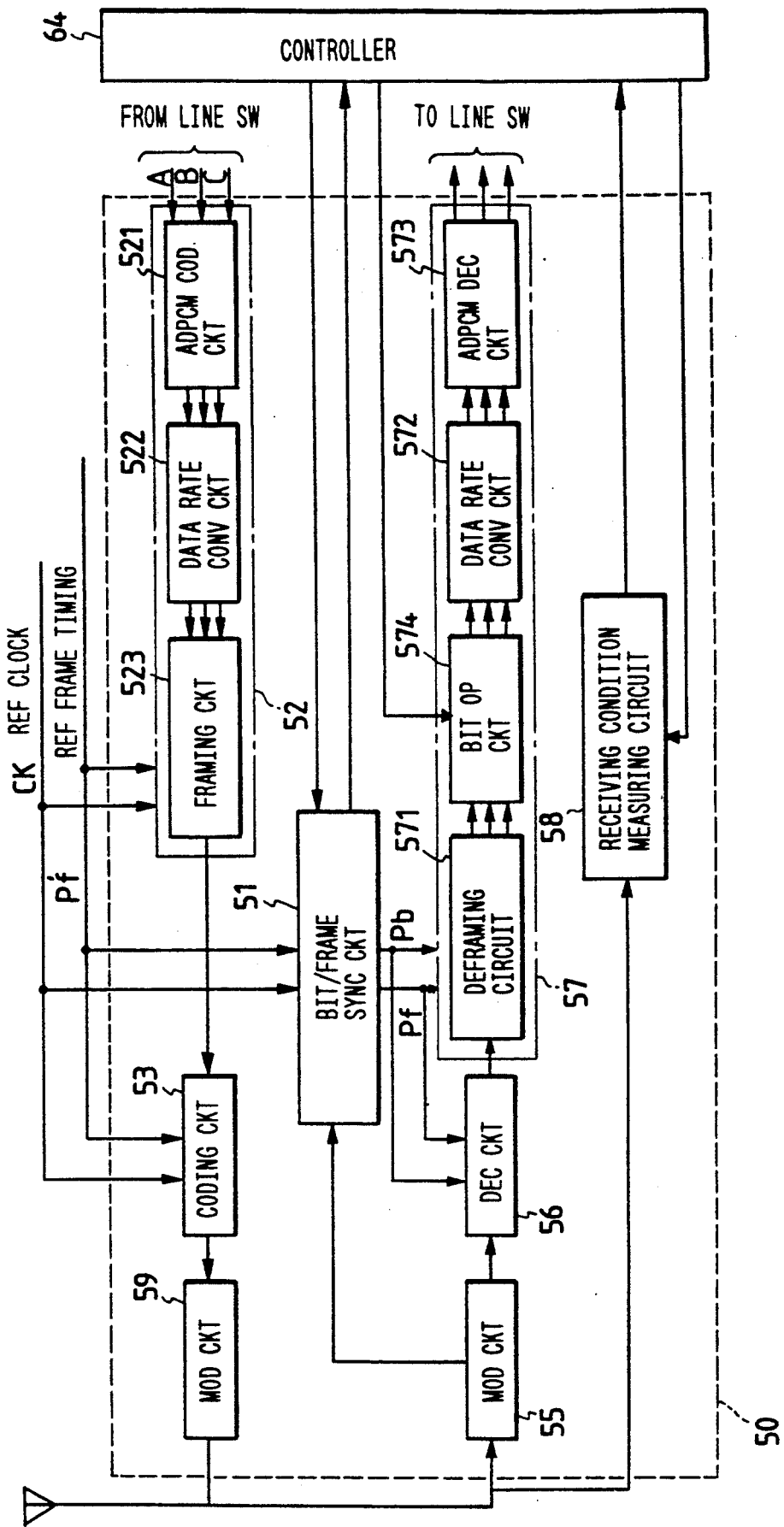
FIG. 18 is a block diagram illustrating the construction of each radio communication equipment in the base station which implements a modified intra-zone channel switching control method.

FIG. 18 is a diagram illustrating an example of the construction of radio equipment 50 modified from those 50-1 to 50-n in FIG. 15 for multiple connection. A signal receiving condition measuring circuit 58 and a bit operation circuit 574 are added to the construction of the radio equipment in FIG. 15.

In the intra-zone radio channel switching operation the line switch 63 in FIG. 15 is multiple-connected to the current radio equipment 50-1 and the new radio equipment 50-n to supply thereto a communication signal from the exchange 25 via the line switch 63. The current radio equipment 50-1 and the new radio equipment 50-n each transmit the signal to the mobile station (multiple transmission).

In FIG. 18 the receiving condition measuring circuit 58 responds to an instruction from the controller 64 to the state of the signal (the receiving level, for instance) received from the mobile station and indicates it to the controller 64. In the case where it is judged from the measured received signal state that no signal is received, the bit operation circuit 574 responds to an instruction from the controller 64 to replace a 0 for that one of the separated slot signals from the deframing circuit 571 which has been judged not to be received. By operating the bit operation circuit 574 and the receiving state measuring circuit 58 in each of the multiple-connected current and new radio equipment 50-1 and 50-n in the intra-zone channel switching operation, the line switch 63 receives a communication signal from the current radio equipment 50-1 and "0, ..., 0" from the new radio equipment 50-n before the channel switching of the mobile station, whereas after the channel switching the channel switch receives "0, ..., 0" from the current radio equipment 50-1 and a communication signal from the new radio equipment 50-n. Accordingly, the line switch 63 is capable of receiving communication signals from the mobile station with no signal dropout before and after the channel switching, by ORing the signals received from both pieces of radio equipment 50-1 and 50-n during the multiple connection (multiple reception).

The line switch 63 switches the multiple connection to a one-to-one connection when it receives from the current radio equipment 50-1 the signal replaced with 0 and the receiving level measured by the signal receiving condition measuring circuit 58 of the new radio equipment 50-n exceeds a certain level. With such multiple reception as mentioned above, the line switch 63 need not be switched simultaneously with the channel switching of the mobile station. This leads to an advantage that no momentary interruption of communication signals occurs, no matter when the mobile station switches the channel.

In the above-described intra-zone channel switching it is also possible to equip the controller 64 with a storage function for storing the synchronized state parameters corresponding to all pieces of radio equipment 50-1 and 50-n accommodated in the base station so that the controller 64 sets the synchronized state parameter of the current radio equipment in the new radio equipment.

It is also possible to connect in mesh-network all pieces of the radio equipment 50-1 to 50-n in the base station and to arrange that when switching radio channel, the synchronized state parameters stored in the bit/frame synchronization circuit 51 of the current radio equipment are set directly into the bit/frame synchronization circuit 51 of the new radio equipment.

The above embodiments have been described with respect to the case of effecting intra-zone channel switching to eliminate the influence of interference or the like, but in the case of employing a sector zone configuration, the invention according to the second aspect is also applicable to channel switching of the mobile station between sectors.

That is, the sector zone configuration uses radio zones in the same base station as sectors, the current radio equipment and the new radio equipment are accommodated in the same base station, and the reference clock is also generated in the same base station; therefore, the channel switching control method according to the second aspect of the present invention can be employed.

While in the above the line switch 63 has been described to be provided in the base station, it may also be provided in the exchange 25.

As described above, the method of the present invention possesses the advantage that radio channel switching can be effected without interrupting communication because bit and frame synchronization between the mobile station and a newly specified base station is established without interrupting communication of the former with the current base station and because the radio channel of the newly specified base station is confirmed.

The method according to the second aspect of the present invention has the advantage that intra-zone channel switching can be effected with high speed because synchronization between the mobile station and a newly specified radio equipment can quickly be established without interrupting the current communication.

We claim:

1. A radio channel switching control method for a mobile speech communication system employing TDMA in which a plurality of transmitter-receivers each allocated a channel of a different frequency are provided and a mobile station communicates with a corresponding one of said transmitter-receivers over a specified channel in a specified one of a predetermined number of time-divided slots of said channel, said method comprising:

(a) a step wherein, when a said transmitter-receiver in communication with said mobile station specifies thereto a new channel to which said mobile station is to be switched, said mobile station performs a pull-in operation for synchronization with a received signal for a specified slot of said new channel in the time interval between two allocated slots in the adjoining frame in a current channel and stores the resulting synchronized state, said mobile station having current-channel synchronized state storage means and new-channel synchronized state storage means;

(b) a step wherein said mobile station returns from said pull-in operation in said new channel to a stored synchronized state in said current channel, communicates with said transmitter-receiver and stores the synchronized state at that time;

(c) a step wherein said mobile station returns to said stored synchronized state in said new channel in the time interval between said two allocated slots in said adjoining frame in said current channel, performs a pull-in operation for said specified slot and stores the resulting synchronized state; and (d) a step wherein said mobile station repeats said steps (b) and (c) until synchronization is established in said new channel and, after establishment of said synchronization, starts communication with said transmitter-receiver through said specified slot of said new channel.

2. The radio channel switching control method according to claim 1, wherein that one of said transmitter-receivers which is allocated said new channel transmits a signal for confirming said mobile station in said specified slot and, in said step (d) said mobile station confirms the reception of said confirmation signal and then proceeds to communication with said transmitter-receiver of said new channel.

3. The radio channel switching control method according to claim 1, wherein said mobile station proceeds to communication with said transmitter-receiver of said new channel after transmitting a synchronizing signal at least once in said specified slot of said new channel in said step (d).

4. The radio channel switching control method according to claim 1, 2, or 3, wherein when said specified slot of said new channel precedes the slot of said current channel in the same frame after establishment of said synchronization in said step (d), and said mobile station repeats said steps (b) and (c) at least once more.

5. The radio channel switching control method according to claim 1, 2, or 3, wherein said transmitter-receiver of said current channel and said transmitter-receiver of said new channel are multiple-connected to each other via line switch means and transmit the same signal to each other in allocated slots of allocated channels at least from the time when said transmitter-receiver of said current channel specifies said new channel to the time when said mobile station proceeds to communication with said transmitter-receiver of said new channel.

6. The radio channel switching control method according to claim 5, wherein said transmitter-receiver of said current channel and said transmitter-receiver of said new channel, after being multiple-connected, each receives a signal from said mobile station, and when the receiving level becomes lower than a predetermined level, a signal of the corresponding slot is replaced with a specific signal and said line switch means ORs signals from said current transmitter-receiver and said new transmitter-receiver to obtain a channel signal.

7. The radio channel switching control method according to claim 1, wherein an idle slot of said new channel is searched, and when said idle slot of said new channel is at the same position as the slot being used by said current channel, said idle slot and an occupied slot of said new channel are exchanged and then said idle slot is used as said specified slot of said new channel.

8. The radio channel switching control method according to claim 1, further comprising a step wherein when it is judged that radio channel switching is necessary, an idle slot of said new channel is searched, and when said idle slot of said new channel is at the same position as the current slot of said current channel, an idle slot of said current channel is searched and is exchanged with the current slot of said current channel.

9. The radio channel switching control method according to claim 1, further comprising a step wherein when an arbitrary slot becomes idle in each channel, the position of an occupied slot after said idle slot is moved up.

10. The radio channel switching control method according to claim 1, wherein said synchronized state storing step includes a step wherein phase differences in clocks and frame timing reproduced from signals received over said current channel and said new channel, respectively, are detected and stored in a memory, said step of returning to said stored synchronized state includes a step wherein said clock phase difference and said frame timing phase difference between said corresponding channels are read out of said memory, and generating a clock and frame timing phase-shifted from said reference clock and said reference frame timing by said read-out phase differences.

11. A radio channel switching control method for a mobile speech communication system employing TDMA, having a plurality of transmitter-receivers supplied with a common reference clock and reference frame timing that are allocated different frequency channels, and a control part for controlling said transmitter-receivers, said transmitter-receivers each having means for synchronizing with a received signal and for storing the timing for synchronization with the received signal in each slot of said allocated frequency channel, a specified one of said transmitter-receivers communicating with a mobile station using an allocated one of a predetermined number of time slots into which each frame is time-divided, said method comprising:

a step wherein said specified transmitter-receiver in communication with said mobile station stores the timing for synchronization with said reference clock of a signal received from said mobile station;

a step wherein when it is judged, based on the receiving condition of said specified transmitter-receiver, that channel switching is necessary, said control part specifies a new channel and a new slot to said mobile station, sets said synchronization timing in the current channel in that one of said transmitter-receivers corresponding to said new channel and causes it to start reception at said set synchronization timing in said newly specified slot; and a step wherein said mobile station transmits a signal in an allocated slot of said current channel in synchronism with a signal received from said corresponding transmitter-receiver and, in response to a channel switching instruction from said transmitter-receiver, switches said current channel to said new channel in an idle time slot between said allocated slot of said current channel and said specified slot of said new channel in the next frame.

12. The radio channel switching control method according to claim 11, wherein a line switch is connected via communication lines to said transmitter-receivers, respectively, said method further comprising:

a step wherein, when it is judged that channel switching is necessary, said control part controls said line switch to multiple-connect therethrough said transmitter-receiver of said current channel and said transmitter-receiver of said new channel;

a step wherein during said multiple connection said transmitter-receiver of said current channel and said transmitter-receiver of said new channel transmit the same signal to said mobile station, the state of reception from said mobile station is measured in one of said current and new channels, and when it is judged to be a non-receiving state, said transmitter-receiver corresponding to said one channel replaces a signal of the corresponding slot with a specific signal and delivers it to said line switch; and a step wherein during said multiple connection said line switch delivers, as a channels signal, the OR of signals received from said transmitter-receivers of said current and new channels.

* * * * *